(12) United States Patent
Kawaguchi et al.

(10) Patent No.: US 12,085,431 B2
(45) Date of Patent: Sep. 10, 2024

(54) ULTRASONIC FLOW SENSOR

(71) Applicant: Keyence Corporation, Osaka (JP)

(72) Inventors: Yasunori Kawaguchi, Osaka (JP); Masaki Wada, Osaka (JP); Masaki Ishihara, Osaka (JP); Daishiro Ishikawa, Osaka (JP); Ryuma Miyake, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 255 days.

(21) Appl. No.: 17/860,251

(22) Filed: Jul. 8, 2022

(65) Prior Publication Data

US 2023/0066279 A1 Mar. 2, 2023

(30) Foreign Application Priority Data

Aug. 31, 2021 (JP) .................. 2021-142011
Aug. 31, 2021 (JP) .................. 2021-142012

(51) Int. Cl.
*G01F 1/663* (2022.01)
*G01F 1/66* (2022.01)
*G01F 1/667* (2022.01)

(52) U.S. Cl.
CPC .............. *G01F 1/663* (2013.01); *G01F 1/667* (2013.01)

(58) Field of Classification Search
CPC . G01F 1/66; G01F 1/667; G01F 1/668; G01F 1/663; G01F 1/32; G01F 1/662; G01F 15/18; G01F 1/665; G01N 2291/02809; G01N 29/024; A61B 8/06; G01P 5/241; A01G 9/02

See application file for complete search history.

(56) References Cited

U.S. PATENT DOCUMENTS

| | | | |
|---|---|---|---|
| 9,671,263 B2 | 6/2017 | Otsu et al. | |
| 9,671,264 B2 | 6/2017 | Kashima | |
| 9,696,195 B2 | 7/2017 | Ishikawa et al. | |
| 10,641,628 B2 | 5/2020 | Niimura | |
| 10,641,629 B2 | 5/2020 | Tsukigi et al. | |

(Continued)

FOREIGN PATENT DOCUMENTS

WO 2006080182 A1 8/2006

OTHER PUBLICATIONS

U.S. Appl. No. 17/860,269, filed Jul. 8, 2022 (65 pages).

*Primary Examiner* — Brandi N Hopkins
(74) *Attorney, Agent, or Firm* — Kilyk & Bowersox, P.L.L.C.

(57) ABSTRACT

Provided is an ultrasonic flow sensor with improved practicality. An ultrasonic wave is transmitted and received by an ultrasonic element. A first flow rate value of a fluid in a pipe is calculated based on a propagation time difference of an ultrasonic signal, a measurement value corresponding to an ultrasonic velocity, and a parameter for identifying an inner diameter of the pipe. A second flow rate value of the fluid in the pipe is calculated based on a frequency shift of the ultrasonic signal and the parameter. The first flow rate value is calculated using a propagation time of the ultrasonic signal as the measurement value in accordance with a correspondence relationship among a distance of a path through which the ultrasonic wave propagates through the fluid in the pipe, a time for which the ultrasonic signal propagates in the path, and the ultrasonic velocity.

14 Claims, 10 Drawing Sheets

(56) References Cited

U.S. PATENT DOCUMENTS

| | | |
|---|---|---|
| 10,732,018 B2 | 8/2020 | Tsukigi et al. |
| 2013/0238260 A1 | 9/2013 | Fukuhara et al. |
| 2015/0114078 A1* | 4/2015 | Shiba .................... G01F 15/022 |
| | | 73/1.16 |
| 2016/0334251 A1* | 11/2016 | Otsu ....................... G01F 15/14 |
| 2017/0167372 A1* | 6/2017 | Akita ..................... F01N 11/00 |

* cited by examiner

ULTRASONIC FLOW SENSOR

CROSS-REFERENCE TO RELATED APPLICATIONS

The present application claims foreign priority based on Japanese Patent Application No. 2021-142011, filed Aug. 31, 2021, and No. 2021-142012, filed Aug. 31, 2021, the contents of which are incorporated herein by references.

BACKGROUND OF THE INVENTION

1. Field of the Invention

The invention relates to an ultrasonic flow sensor that measures a flow rate of a fluid flowing in a pipe.

2. Description of Related Art

Ultrasonic flow sensors configured to measure a flow rate of a fluid flowing in a pipe based on a plurality of methods are known. For example, JP 2013-185973 A discloses an ultrasonic measuring device that performs measurement by a transmission method and measurement by a reflection method. In the transmission method, a first flow rate signal indicating a flow rate of a fluid is obtained by performing a calculation on receive signals of ultrasonic waves transmitted through the fluid. In the reflection method, a second flow rate signal indicating a flow rate of a fluid is obtained by performing a correlation calculation on receive signals of ultrasonic waves reflected by air-bubbles or the like contained in the fluid.

A correction coefficient storage unit stores a first correction coefficient used to correct the first flow rate signal and a second correction coefficient used to correct the second flow rate signal.

A volume of air bubbles contained in the fluid is determined, and any one of the first flow rate signal corrected using the first correction coefficient and the second flow rate signal corrected using the second correction coefficient is output based on the determined volume of air bubbles.

The flow rate of the fluid is calculated using a parameter, such as a sonic velocity in the fluid or an inner diameter of the pipe, input by a user. Even if the parameter is the same, the degree of contribution of the parameter to the calculated flow rate varies depending on flow rate measurement methods. When the parameter is accurate, flow rates calculated based on a plurality of measurement methods match each other.

However, it is not easy to input the accurate parameter. When the parameter input by the user is not accurate, the calculated flow rate greatly differs for each measurement method. Therefore, even in a case where a flow rate actually flowing through a pipe does not change, the calculated flow rate may discontinuously fluctuate. Therefore, practicality of the ultrasonic flow sensor deteriorates.

SUMMARY OF THE INVENTION

An object of the invention is to provide an ultrasonic flow sensor with improved practicality.

According to one embodiment of the invention, an ultrasonic flow sensor includes: a plurality of ultrasonic elements that perform at least one of transmission and reception of an ultrasonic signal; a first measurement unit that measures a propagation time of the ultrasonic signal and a propagation time difference of the ultrasonic signal when the ultrasonic signal transmitted through a fluid in a pipe is transmitted and received between a pair of ultrasonic elements among the plurality of ultrasonic elements; a propagation time identifying unit that identifies a fluid propagation time that is a time for which the ultrasonic signal propagates in a path for propagating in the fluid in the pipe based on the propagation time of the ultrasonic signal measured by the first measurement unit; a first calculation unit that calculates a first flow rate value of the fluid in the pipe based on the propagation time difference of the ultrasonic signal measured by the first measurement unit, a measurement value corresponding to an ultrasonic velocity in the fluid in the pipe, and a parameter for identifying an inner diameter of the pipe; a second measurement unit that measures a frequency shift of the ultrasonic signal when one ultrasonic element or a pair of ultrasonic elements among the plurality of ultrasonic elements transmits the ultrasonic signal toward the fluid in the pipe and receives the ultrasonic signal reflected in the fluid; and a second calculation unit that calculates a second flow rate value of the fluid in the pipe based on the frequency shift of the ultrasonic signal measured by the second measurement unit and the parameter, the first calculation unit calculating the first flow rate value using the fluid propagation time as the measurement value in accordance with a correspondence relationship among a distance of the path, the fluid propagation time, and the ultrasonic velocity.

According to another embodiment of the invention, an ultrasonic flow sensor includes: a plurality of ultrasonic elements that perform at least one of transmission and reception of an ultrasonic signal; a first measurement unit that measures a propagation time of the ultrasonic signal and a propagation time difference of the ultrasonic signal when the ultrasonic signal transmitted through a fluid in a pipe is transmitted and received between a pair of ultrasonic elements among the plurality of ultrasonic elements; a propagation time identifying unit that identifies a fluid propagation time that is a time for which the ultrasonic signal propagates in a path for propagating in the fluid in the pipe based on the propagation time of the ultrasonic signal measured by the first measurement unit; a first calculation unit that calculates a first flow rate value of the fluid in the pipe based on the propagation time difference of the ultrasonic signal measured by the first measurement unit, a measurement value corresponding to an ultrasonic velocity in the fluid in the pipe, and a parameter for identifying an inner diameter of the pipe; a second measurement unit that measures a frequency shift of the ultrasonic signal when one ultrasonic element or a pair of ultrasonic elements among the plurality of ultrasonic elements transmits the ultrasonic signal toward the fluid in the pipe and receives the ultrasonic signal reflected in the fluid; and a second calculation unit that calculates a second flow rate value of the fluid in the pipe based on the frequency shift of the ultrasonic signal measured by the second measurement unit and the parameter, the first calculation unit calculating the first flow rate value using the fluid propagation time as the measurement value to reduce a difference in influence of the parameter with respect to the first flow rate value and the second flow rate value.

According to still another embodiment of the invention, an ultrasonic flow sensor that measures a flow rate of a fluid flowing in a pipe includes: a first ultrasonic element that transmits and receives an ultrasonic wave; a second ultrasonic element that transmits and receives an ultrasonic wave; a first calculation unit that calculates a first flow rate value indicating a flow rate of the fluid based on a propagation time difference of the ultrasonic wave between the first ultrasonic element and the second ultrasonic element; and a second calculation unit that calculates a second flow rate value indicating a flow rate of the fluid based on a frequency shift of the ultrasonic wave received by the first ultrasonic element after the first ultrasonic element transmits the ultrasonic wave, at least one of the first flow rate value and the second flow rate value being calculated using a calculation formula in which a value which is to be input by a user is identified based on a measurement value to make a relationship between the first flow rate value and a value, which is included in a calculation formula for the first flow rate value and to be input by the user, identical to a relationship between the second flow rate value and a value which is included in a calculation formula for the second flow rate value and to be input by the user.

According to the invention, the practicality of the ultrasonic flow sensor can be improved.

DETAILED DESCRIPTION OF PREFERRED EMBODIMENTS

(1) Schematic Configuration of Ultrasonic Flow Sensor

Figure 1:
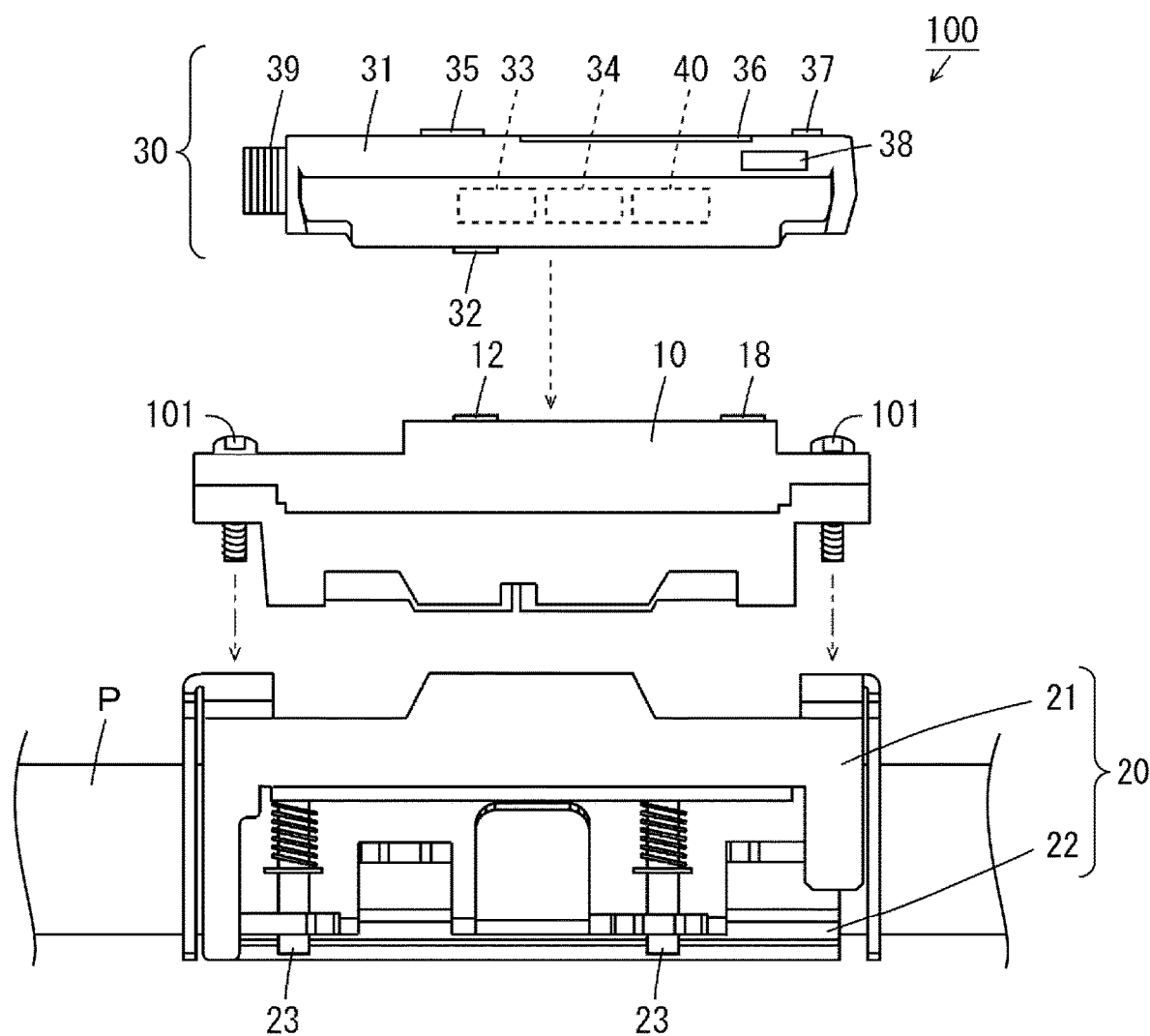
FIG. 1 is a side view of an ultrasonic flow sensor according to one embodiment of the invention.

Hereinafter, an ultrasonic flow sensor according to one embodiment of the invention will be described with reference to the drawings. FIG. 1 is a side view illustrating a configuration of an ultrasonic flow sensor according to the embodiment of the invention. An ultrasonic flow sensor 100 includes a sensor head 10, a clamp part 20, and a display 30. The sensor head 10 is attached to a pipe P and calculates a flow rate value of a fluid flowing through the pipe P. The clamp part 20 is attached to the pipe P, and the sensor head 10 is attached to the pipe P by being attached to the clamp part 20. The display 30 is attached to the sensor head 10, and performs display output and output to external equipment according to the flow rate value calculated by the sensor head 10. In the embodiment, a maximum inner diameter (diameter) of the pipe P is, for example, an inner diameter corresponding to a pipe nominal diameter "50 A" defined in the JIS standard. For example, an inner diameter of a steel pipe having the nominal pipe diameter "50 A" is 52.9 mm. In the following description, an example in which the sensor head 10 is attached to an upper surface of the pipe P extending horizontally will be described.

The sensor head 10 includes a connector 12, a display lamp 18, and sensor fixing screws 101. The connector 12 and the display lamp 18 are provided on an upper surface of the sensor head 10. The sensor fixing screws 101 are inserted respectively into holes provided at both ends of the sensor head 10 in a direction along the pipe P.

The clamp part 20 includes an upper clamp member 21, a lower clamp member 22, and a clamp fixing screw 23. The upper clamp member 21 is attached from the upper side of the pipe P, the lower clamp member 22 is attached from the lower side of the pipe P, and the upper clamp member 21 and the lower clamp member 22 are coupled to each other by a plurality of the clamp fixing screws 23 so as to sandwich the pipe P. As a result, the clamp part 20 is attached to an outer peripheral surface of the pipe P. As indicated by one-dot chain line arrows in FIG. 1, the two sensor fixing screws 101 are screwed into the holes provided in an upper surface of the upper clamp member 21. As a result, the sensor head 10 is held by the clamp part 20 with a lower surface being in contact with the pipe P.

The display 30 includes a housing part 31, a connector 32, a control unit 33, a storage element 34, an operation unit 35, a display unit 36, a display lamp 37, a first connection port 38, a second connection port 39, and a power supply circuit 40.

The housing part 31 has a substantially rectangular parallelepiped shape. The housing part 31 is attached to the upper surface of the sensor head 10 as indicated by a dotted line arrow in FIG. 1. The housing part 31 accommodates the control unit 33, the storage element 34, and the power supply circuit 40.

The connector 32 is provided on a lower surface of the housing part 31. When the connector 12 and the connector 32 are connected, the display 30 and the sensor head 10 can communicate with each other. The connector 12 and the connector 32 are directly connected by attaching the housing part 31 to the upper surface of the sensor head 10. In addition, the connector 12 and the connector 32 are connected via a cable (not illustrated). At this time, the housing part 31 is detached from the sensor head 10. In this manner, the connector 12 and the connector 32 can be connected to each other by a predetermined method regardless of whether the housing part 31 is attached to the sensor head 10 or a housing part 11 is detached from the sensor head 10. That is, the connector 32 of the display 30 and the connector 12 of the sensor head 10 are connected in a state in which the display 30 is attachable to and detachable from the sensor head 10.

The control unit 33 includes, for example, a central processing unit (CPU) as a processor, a memory, other storage devices, and the like, and controls each unit of the display 30 according to a program stored in the memory. To the control unit 33, the flow rate value calculated by the sensor head 10 is input from the sensor head 10 via the connector 32, and a parameter designated by a user operating the operation unit 35 is input. The control unit 33 controls the storage element 34 to store the flow rate value. Furthermore, the control unit 33 compares the flow rate value with a predetermined threshold. The control unit 33 controls operations of the display unit 36 and the display lamp 37 based on a result of the comparison. In addition, the control unit 33 generates a switching signal based on the comparison result, and outputs the switching signal to an external device via the second connection port.

The storage element 34 is a ring buffer. The storage element 34 sequentially stores log data in which the flow rate value calculated by the sensor head 10 is associated with time when the flow rate value is input at predetermined time intervals. The log data may include a maximum flow rate, a minimum flow rate, an integrated flow rate, a level of the switching signal, or the like. When the log data is stored in the entire storage area of the storage element 34, the log data stored the earliest is overwritten with the latest log data. Therefore, the log data once stored in the storage element 34 is held for a certain period until being overwritten with the latest log data.

The operation unit 35 is provided on an upper surface of the housing part 31. The user operates the operation unit 35 to input the threshold to be compared with the flow rate value or parameters. The user may select desired parameters from options displayed on the display unit 36, or may directly indicate values of the desired parameters. The parameters input from the operation unit 35 include parameters related to an initial setting for calculating the flow rate, frequently used parameters, and infrequently used parameters. The parameters related to the initial setting include a material of the pipe and an outer diameter of the pipe P in a standard. The outer diameter of the pipe P in the standard is a parameter that can be designated by the user based on the standard, and a nominal diameter defined in the predetermined standard is input. It may be configured such that nominal diameters of standards or outer diameters corresponding to the nominal diameters of the standards are displayed in a list, and the user selects one from the list. The frequently used parameters include a response time, a display resolution, hysteresis, a zero cut flow rate, a direction in which a fluid flows, a cycle of density sensing of microbubbles to be described later, and the like. These frequently used parameters are parameters related to the control unit 33 generating the switching signal based on the flow rate value and outputting the switching signal. Thus, it is easy for the user to input the respective parameters while referring to an actual output result in order to obtain a desired output from the ultrasonic flow sensor 100, and it is assumed that the parameters are frequently used. On the other hand, the infrequently used parameters include a flow rate calculation mode, the outer diameter of the pipe P, a thickness of the pipe P, a sonic velocity in the pipe P, a kinematic viscosity of the fluid, and the like. These parameters are parameters related to the sensor head 10 calculating the flow rate value. Thus, these parameters are parameters that are input particularly by a user who desires to adjust the flow rate value calculated by the sensor head 10 among users who desire to obtain a desired output from the ultrasonic flow sensor 100, and thus, are assumed to be relatively infrequently used. Note that a parameter related to a dimension of the pipe P, which is input as the infrequently used parameter, is a parameter whose value is changed when the user further finely adjusts a value corresponding to the nominal diameter of the standard. The parameters input from the operation unit 35 are given to the sensor head 10.

The display unit 36 is provided on the upper surface of the housing part 31. The display unit 36 displays the flow rate value of the fluid calculated by the sensor head 10, the comparison result between the flow rate value and the threshold, and items of the parameters input by operating the operation unit 35. Since the display 30 is attachable to and detachable from the sensor head 10 as described above, the user can arrange the display 30 at a suitable position. Accordingly, the user can visually recognize a state of the flow rate of the pipe P even at a position away from a portion of the pipe P to which the sensor head 10 is attached.

The display lamp 37 includes a plurality of light emitting diodes that emit light in different colors, and is provided on the upper surface of the housing part 31. The display lamp 37 lights up or blinks in an aspect in which a level of the switching signal generated by the control unit 33 can be identified. That is, the display lamp 37 lights up or blinks in an aspect in which a display indicating that the flow rate of the fluid flowing through the pipe P is equal to or more than a certain amount and a display indicating that the flow rate of the fluid flowing through the pipe P is less than the certain amount can be identified. Since the display lamp 37 is provided in the display 30 similarly to the display unit 36, the user can visually recognize the state of the flow rate of the pipe P at a suitable position. Note that it is assumed in the following description that the fluid flowing through the pipe P fills a cross section of the pipe P, and the fluid flowing through the pipe P is referred to as the fluid in the pipe P.

The connection port 38 is a universal serial bus (USB) port and is provided on a side surface of the housing part 31. When the connection port 38 is connected to an external information processing device by a cable (not illustrated), the log data stored in the storage element 34 is output to the information processing device.

The connection port 39 is the M12 port and is provided on an end surface of the housing part 31. The connection port 39 is connected to an external device such as a personal computer or a programmable logic controller by a cable (not illustrated). The switching signal generated by the control unit 33 and output to the external device via the connection port 39 is a signal indicating which one of two states of a state in which the flow rate value calculated by the sensor head 10 is a value equal to or larger than the predetermined threshold, and a state in which the flow rate value is smaller than the predetermined threshold. That is, the switching signal is a signal obtained by binarizing the flow rate of the fluid in the pipe P by the comparison with the threshold. The switching signal is a signal used by the external device capable of controlling another device to switch between an on state and an off state of the other device according to the flow rate of the fluid in the pipe P. In this manner, when the another device is controlled according to the flow rate of the fluid in the pipe P, it can be said that the ultrasonic flow sensor 100 functions as a flow switch that switches an operation state of the another device by comparing the flow rate of the fluid in the pipe P with the threshold.

Note that the switching signal is generated by comparing the flow rate value calculated by the sensor head 10 with the predetermined threshold in the embodiment, but it suffices that the flow rate of the fluid in the pipe P is equal to or more than the certain amount and is less than the certain amount is reflected in the switching signal. As will be described later, the sensor head 10 of the embodiment calculates the flow rate value based on a flow velocity value of the fluid and a cross-sectional area of the pipe P, and thus, it may be configured such that the switching signal is generated by comparing the flow velocity value with a threshold related to a flow velocity.

The power supply circuit 40 converts a voltage supplied by an external commercial power supply into a voltage suitable for the ultrasonic flow sensor 100, and supplies the converted voltage to the control unit 33, the storage element 34, the display unit 36, and the display lamp 37. In addition, the power supply circuit 40 supplies the converted voltage to each unit of the sensor head 10 via the connector 32.

Figure 2:
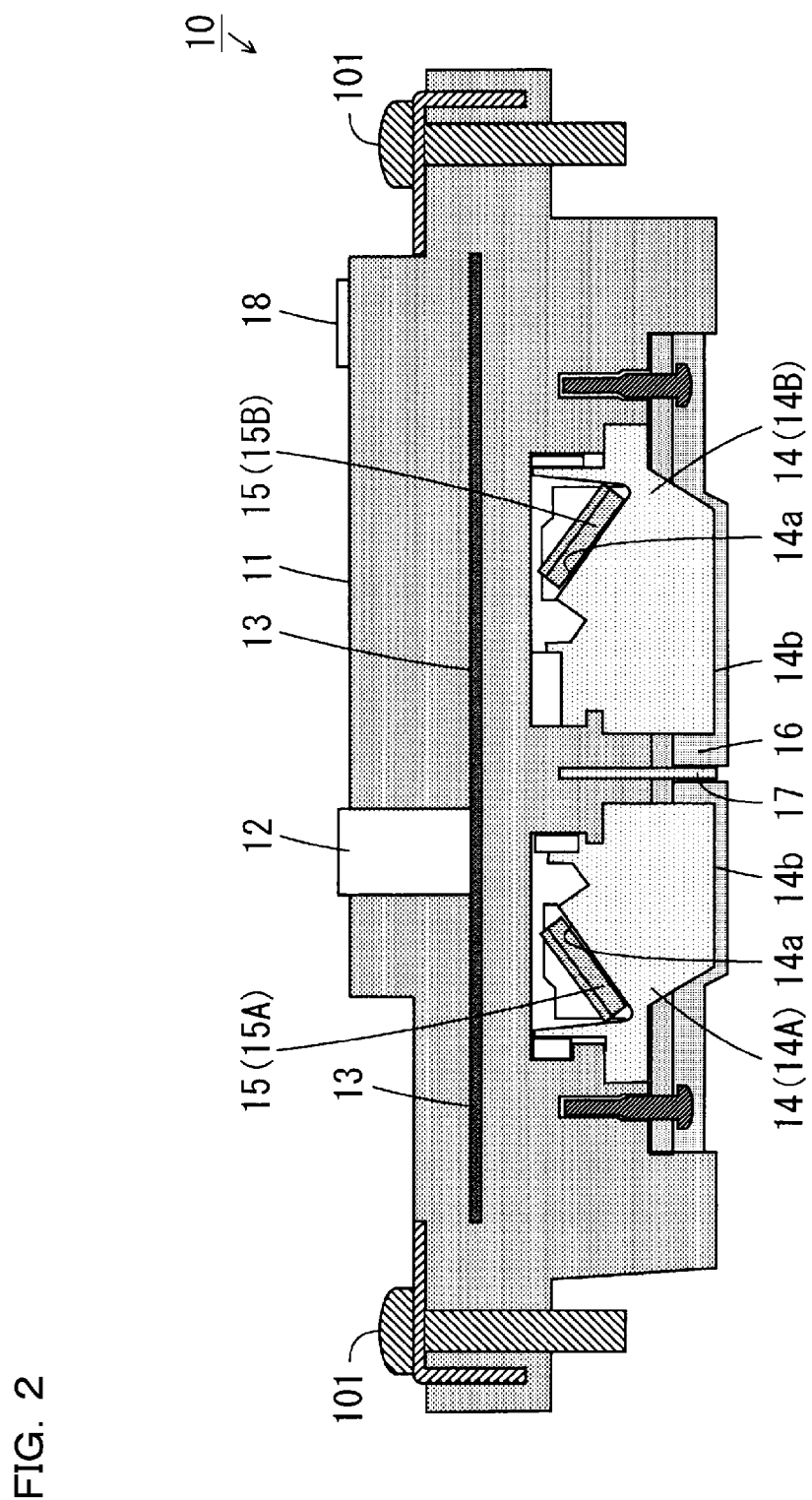
FIG. 2 is a schematic cross-sectional view illustrating a configuration of a sensor head in FIG. 1.

FIG. 2 is a schematic cross-sectional view illustrating a configuration of the sensor head 10 of FIG. 1. The sensor head 10 includes the housing part 11, a connector 12, a control unit 13, two wedge materials 14, two ultrasonic elements 15, an acoustic couplant 16, an ultrasonic wave shielding plate 17, and a display lamp 18.

The housing part 11 has a substantially rectangular parallelepiped shape having an opening in a lower portion. The connector 12 is provided on an upper surface of the housing part 11. The wedge material 14 is accommodated in the opening in the lower portion of the housing part 11, and the acoustic couplant 16 is exposed. The housing part 11 accommodates the control unit 13 and the ultrasonic element 15.

The connector 12 is provided on the upper surface of the housing part 11. As described above, the connector 12 is at a position connectable to the connector 32 when the housing part 31 is attached to the housing part 11.

The control unit 13 includes, for example, a central processing unit (CPU) as a processor, a memory, other storage devices, and the like, and controls each unit of the sensor head 10 according to a program stored in the memory. The control unit 13 acquires parameters input to the control unit 33 via the connector 12. In addition, the control unit 13 controls the two ultrasonic elements 15 to transmit an ultrasonic signal from the ultrasonic element 15 and receive the ultrasonic signal, and measures measurement values related to the transmission and reception of the ultrasonic signal. Furthermore, the control unit 13 calculates the flow rate of the fluid flowing through the pipe P based on the measurement values by the control of the ultrasonic element 15 and the parameters acquired from the control unit 33. Details of a method of calculating the flow rate will be described later.

The wedge material 14 is located between the ultrasonic element 15 and the pipe P when the sensor head 10 is attached to the clamp part 20. The wedge material 14 is made of a non-metallic material having high rigidity and high acoustic transmissivity. In addition, the wedge material 14 is preferably made of a material having high environmental resistance. In the embodiment, the wedge material 14 is made of polyphenylene sulfide (PPS) resin and polyether ether ketone (PEEK) resin, but may be made of ULTEM (registered trademark) resin. The wedge material 14 has an element coupling surface 14a facing obliquely upward and a pipe coupling surface 14b facing downward.

In the following description, when the two wedge materials 14 are distinguished, one wedge material 14 is referred to as a wedge material 14A, and the other wedge material 14 is referred to as a wedge material 14B. The wedge materials 14A and 14B are attached to the opening in the lower portion of the housing part 11 in a state of being arrayed in the longitudinal direction of the housing part 11 such that the element coupling surfaces 14a face obliquely upward and outward. As a result, a space into which a liquid such as water and oil is not able to enter is formed inside the housing part 11.

The ultrasonic element 15 can transmit the ultrasonic signal and receive the ultrasonic signal. The control unit 13 causes the ultrasonic element 15 to selectively operate in a transmission mode for transmitting the ultrasonic signal and a reception mode for receiving the ultrasonic signal. The ultrasonic element 15 is a composite element. Thus, a reverberation time of a transmitted ultrasonic wave is short, and noise when the same ultrasonic element 15 is operated in the reception mode after being operated in the transmission mode is reduced. In particular, in a pulse-Doppler system to be described later, the ultrasonic element 15 that transmits an ultrasonic wave and the ultrasonic element 15 that receives a reflected ultrasonic signal are preferably the same ultrasonic element 15 in order to receive the ultrasonic signal reflected by a reflector in the fluid at a position where the intensity of the ultrasonic signal is high. At this time, the reception accuracy is affected by reverberation occurring when the ultrasonic signal is transmitted, and thus, the ultrasonic element 15 operated by the Doppler system is preferably a composite element having a short reverberation time. Therefore, the measurement accuracy in the pulse-Doppler system is improved since the ultrasonic element 15 is the composite element. Note that an ultrasonic signal is propagated in two directions of a direction along a flow direction of the fluid in the pipe P and a direction opposite to the flow direction in a propagation time difference system to be described later. If the ultrasonic element 15 that transmits the ultrasonic signal at the time of propagating the ultrasonic signal in one direction and the ultrasonic element 15 that receives the ultrasonic signal at the time of propagating the ultrasonic signal in the other direction are the same ultrasonic element 15, the number of necessary ultrasonic elements 15 is reduced. Therefore, the measurement accuracy is improved when the number of the ultrasonic elements 15 is reduced since the ultrasonic element 15 is the composite element even in the propagation time difference system.

In the following description, when two ultrasonic elements 15 are distinguished, one ultrasonic element 15 is referred to as an ultrasonic element 15A, and the other ultrasonic element 15 is referred to as an ultrasonic element 15B. The ultrasonic element 15A is bonded to the element coupling surface 14a of the wedge material 14A, and the ultrasonic element 15B is bonded to the element coupling surface 14a of the wedge material 14B. As a result, the ultrasonic elements 15A and 15B are accommodated in the housing part 11 in a state of forming a predetermined angle with respect to the pipe P.

The acoustic couplant 16 has a solid shape and is formed using a soft elastic material made of polymer rubber, a gel-like substance, or the like. The acoustic couplant 16 is provided in the lower portion of the housing part 11 so as to be in contact with the pipe coupling surface 14b of the wedge material 14. A lower surface of the acoustic couplant 16 slightly protrudes downward from the lower surface of the housing part 11. The sensor head 10 is fixed to the clamp part 20 by the two sensor fixing screws 101, so that the sensor head 10 is attached to the pipe P in a state in which the acoustic couplant 16 is pressed against the pipe P. A lower surface of the acoustic couplant 16 is brought into contact with the pipe P to match acoustic impedance between the wedge material 14 and the pipe P. Therefore, the acoustic couplant 16 preferably has an acoustic impedance value between an acoustic impedance value of the wedge material 14 and an acoustic impedance value of the pipe P.

The ultrasonic wave shielding plate 17 is made of, for example, foamed rubber and has a flat plate shape. The ultrasonic wave shielding plate 17 is arranged between the wedge materials 14A and 14B so as to penetrate the acoustic couplant 16 in a state in which a plate surface is erected along the vertical direction. In this case, an ultrasonic component that does not pass through the pipe P is prevented from being directly transmitted between the wedge materials 14A and 14B.

The display lamp 18 includes, for example, a plurality of light emitting diodes, and lights up or blinks in an aspect in which the level of the switching signal can be identified similarly to the display lamp 37 of the display 30. Therefore, when the display 30 is attached to the sensor head 10, the user can grasp a state of the pipe P by visually recognizing the display lamp 37 of the display 30. On the other hand, the display 30 can be detached from the sensor head 10 to separate the display 30 from the sensor head 10 by connecting the connector 12 and the connector 32 using the cable as described above. Therefore, the user can grasp the state of the pipe P by visually recognizing the display lamp 18 of the sensor head 10, and can grasp the state of the pipe P by the display lamp 37 of the display 30 arranged at a suitable position even in a state in which the display 30 is separated from the sensor head 10.

(2) Operation of Sensor Head

Functional configurations of the sensor head 10 and the display 30 will be described with reference to FIG. 3.

The control unit 13 includes, for example, a central processing unit (CPU) as a processor and a storage unit 131, and controls each unit of the sensor head 10 according to a program stored in the storage unit 131.

The control unit 13 executes processing according to the flow rate calculation mode selected by the user operating the operation unit 35 in FIG. 1, and outputs a flow rate value to the display 30. More specifically, a propagation time difference mode, the pulse-Doppler mode, and a hybrid mode are selected as the flow rate calculation mode of the sensor head 10. In the propagation time difference mode, a flow rate value calculated by the propagation time difference system is output to the display 30. In the pulse-Doppler mode, a flow rate value calculated by the pulse-Doppler system is output to the display 30. In the hybrid mode, a flow rate value, obtained by combining the flow rate value calculated by the propagation time difference system and the flow rate value calculated by the pulse-Doppler system, is output to the display 30.

The control unit 13 includes the storage unit 131, a first measurement unit 132, a propagation time identifying unit 133, a first calculation unit 134, a second measurement unit 135, a second calculation unit 136, a cycle skip determination unit 137, a microbubble sensing unit 138, and a flow rate value combining unit 139.

The storage unit 131 stores parameters and the like used for various types of control of the control unit 13. For example, the parameters such as a velocity C', an incident angle θ', an incident angle θ, and a Blasius coefficient, which will be described later, are stored in advance. Furthermore, a wedge propagation time $\tau_1$ and a couplant propagation time $\tau_2$ are stored in advance in the storage unit 131 as known parameters.

The first measurement unit 132 is a measurement unit configured to calculate the flow rate of the fluid in the pipe P by the propagation time difference system. The first measurement unit 132 controls the ultrasonic element 15A and the ultrasonic element 15B to measure a propagation time ta until an ultrasonic signal transmitted from the ultrasonic element 15A toward the pipe P is reflected by an inner wall of the pipe P and propagated to the ultrasonic element 15B, a propagation time tb until an ultrasonic signal transmitted from the ultrasonic element 15B toward the pipe P is reflected by the inner wall of the pipe P and propagated to the ultrasonic element 15A, and a propagation time difference Δt which is a difference between the propagation time ta and the propagation time tb.

The propagation time ta, the propagation time tb, and the propagation time difference Δt are measurement values measured by the first measurement unit 132.

Figure 4:
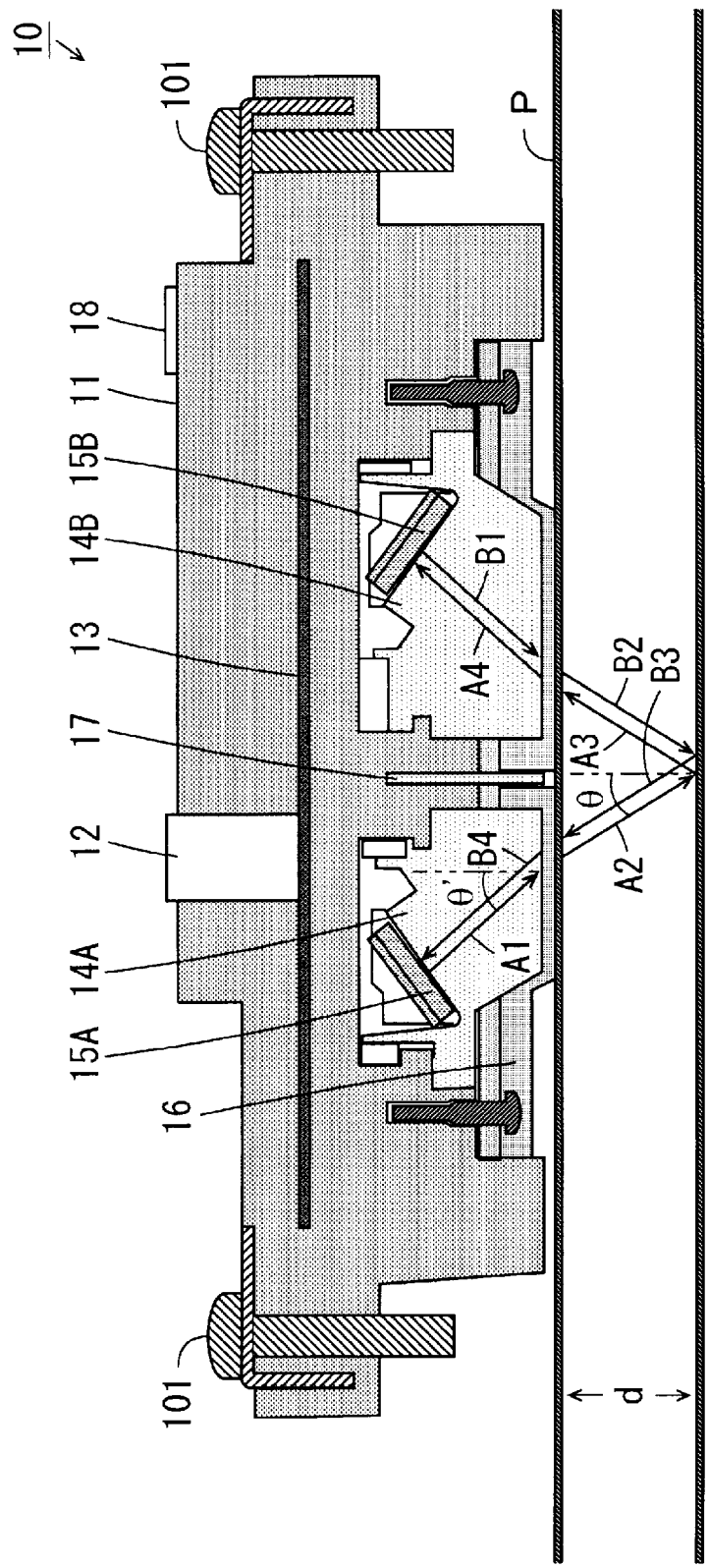
FIG. 4 is a view for describing an operation of the sensor head in a propagation time difference system.

An operation of the sensor head 10 when the first measurement unit 132 measures the measurement value will be described with reference to FIG. 4. First, the first measurement unit 132 controls the ultrasonic element 15A to transmit an ultrasonic signal from the ultrasonic element 15A toward the pipe P. The ultrasonic signal transmitted by the ultrasonic element 15A propagates through the wedge material 14A in a direction of an arrow A1, passes through the acoustic couplant 16, enters the fluid in the pipe P, and propagates through the fluid in the pipe P in a direction of an arrow A2. The ultrasonic signal propagated in the fluid is reflected by the inner wall of the pipe P, propagates in the fluid in a direction of an arrow A3, passes through the acoustic couplant 16, enters the wedge material 14B, propagates through the wedge material 14B in a direction of an arrow A4, and is received by the ultrasonic element 15B. In this manner, the first measurement unit 132 measures the propagation time ta until the ultrasonic signal transmitted by the ultrasonic element 15A is received by the ultrasonic element 15B.

Next, the first measurement unit 132 controls the ultrasonic element 15B to transmit an ultrasonic wave. The ultrasonic signal transmitted by the ultrasonic element 15B propagates through a path including the wedge material 14, the acoustic couplant 16, the pipe P, and the fluid in the pipe P as indicated by arrows B1, B2, B3, and B4 similarly to a path through which the ultrasonic signal transmitted from the ultrasonic element 15A propagates, and is received by the ultrasonic element 15A. In this manner, the first measurement unit 132 measures the propagation time tb until the ultrasonic signal transmitted by the ultrasonic element 15B is received by the ultrasonic element 15A.

Further, the first measurement unit 132 measures the propagation time ta and the propagation time tb, and then, measures the propagation time difference Δt.

In this manner, the measurement for calculating the flow rate by the propagation time difference system requires an ultrasonic element that transmits and receives the ultrasonic signal propagating along the flow direction of the fluid, and an ultrasonic element that transmits and receives the ultrasonic signal propagating against the flow direction of the fluid. In the embodiment, the measurement for the propagation time difference system is performed by the two ultrasonic elements 15. Thus, the number of ultrasonic elements required for the calculation of the flow rate by the propagation time difference system is the minimum, and there is a certain effect on miniaturization of the sensor head 10. The number of ultrasonic elements for the propagation time difference system is not limited to two, and three or more ultrasonic elements may be used.

In addition, all the ultrasonic elements 15 are provided on the upper side. Which is one side of the pipe P in the embodiment, and the propagation path of the ultrasonic signal is a path reflected by the inner wall below the pipe P. Since the plurality of ultrasonic elements 15 are provided on one side with respect to the pipe P, the user can easily arrange the ultrasonic elements on the pipe P by access from the one side. In particular, since the housing part 11 accommodates the two ultrasonic elements 15 in the embodiment, the user can more easily arrange the plurality of ultrasonic elements on the pipe P. The propagation path of the ultrasonic signal in the measurement for the propagation time difference system is not limited to the configuration in which the ultrasonic signal is reflected by the inner wall on the side opposite to the side on which the ultrasonic element is arranged, and may adopt a configuration in which an ultrasonic signal propagates from an ultrasonic element provided on one side of the pipe P to an ultrasonic element provided on the other side of the pipe P. For example, a configuration may be adopted in which the ultrasonic element 15B in the embodiment is arranged on the lower side of the pipe P, and an ultrasonic signal propagates from the ultrasonic element 15A arranged on the upper side to the ultrasonic element 15B. In this case, the reflection on the inner wall of the pipe P is not included in a path through which the ultrasonic signal propagates, and thus, the ultrasonic element that receives the ultrasonic signal can receive the ultrasonic signal having a relatively high intensity.

Returning to FIG. 3, the control unit 13 includes the propagation time identifying unit 133. The propagation time identifying unit 133 identifies a fluid propagation time $\tau_4$ for which an ultrasonic signal when the propagation time ta is measured by the first measurement unit 132 propagates through the fluid in the pipe P. Note that the fluid propagation time $\tau_4$ identified by the propagation time identifying unit 133 is a time for which the ultrasonic signal propagates through the path indicated by the arrow A2 and the arrow A3 in FIG. 4.

Figure 5:
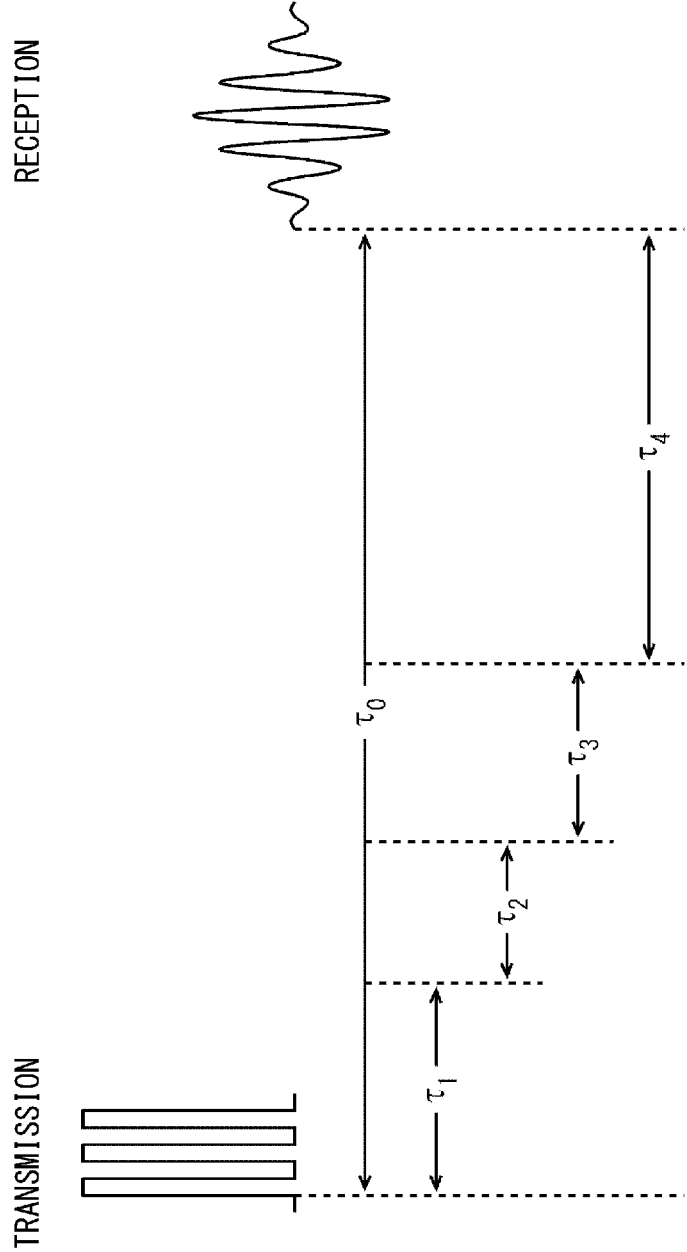
FIG. 5 is a view for describing a method for identifying a value related to a sonic velocity.

The identification of the fluid propagation time $\tau_4$ by the propagation time identifying unit 133 will be described with reference to FIG. 5. The path through which the ultrasonic signal propagates from the ultrasonic element 15A to the ultrasonic element 15B includes the wedge material 14, the acoustic couplant 16, the pipe P, and the fluid in the pipe P, and the propagation time ta measured by the first measurement unit 132 is the time for which the ultrasonic signal propagates through the path including the wedge material 14, the acoustic couplant 16, the pipe P, and the fluid in the pipe P. Therefore, the propagation time ta (To in FIG. 5) includes the wedge propagation time $\tau_1$ for propagating through the wedge material 14, the couplant propagation time $\tau_2$ for propagating through the acoustic couplant 16, the pipe propagation time $\tau_3$ for propagating through the pipe P, and the fluid propagation time $\tau_4$ for propagating through the fluid in the pipe P. The wedge propagation time $\tau_1$ and the couplant propagation time $\tau_2$ are known values measured in advance, and are stored in the storage unit 131 at the time of shipment of the ultrasonic flow sensor 100. In addition, the user inputs a pipe sonic velocity as a parameter by referring to a table in which materials of the pipe are associated with pipe sonic velocities, and the pipe propagation time $\tau_3$ is identified based on the parameter. Thus, the propagation time identifying unit 133 identifies the fluid propagation time $\tau_4$ by subtracting the wedge propagation time $\tau_1$, the couplant propagation time $\tau_2$, and the pipe propagation time $\tau_3$ from a propagation time $\tau 0$.

Returning to FIG. 3, the control unit 13 includes the first calculation unit 134. The first calculation unit 134 calculates the flow rate of the fluid in the pipe P by the propagation time difference system. More specifically, a flow rate value V1 is calculated by the following Formula (1) including the propagation time difference $\Delta t$, which is a measurement value measured by the first measurement unit 132, and a fluid propagation time T. Note that the fluid propagation time T is the fluid propagation time $\tau_4$ identified by the propagation time identifying unit 133 in the embodiment.

[Formula 1]

$$V1 = \frac{C'}{2\sin\theta'} \cdot \frac{\Delta t}{1} \cdot \frac{1}{T} \cdot \frac{d^2\pi}{4} \cdot \lambda \qquad (1)$$

In the above Formula (1), C' is a velocity of the ultrasonic wave in the wedge material 14, and $\theta'$ is an incident angle of the ultrasonic wave on the wedge material 14. The inner diameter of the pipe P is denoted by d, and $\lambda$ is a pipe friction coefficient (Blasius coefficient). The velocity C', the incident angle $\theta'$, the incident angle $\theta$, and the Blasius coefficient are known and stored in advance in the storage unit 131 of the control unit 13. The inner diameter d is a parameter input by the user operating the operation unit 35. Therefore, the first calculation unit 134 calculates the flow rate value V1 based on the propagation time difference $\Delta t$, which is the measurement value measured by the first measurement unit 132, the fluid propagation time 14 identified by the propagation time identifying unit 133, the parameter for identifying the inner diameter d of the pipe, and the values stored in advance in the storage unit 131. Note that $d^2\pi/4$ in Formula (1) or Formulas (2) to (4) to be described later is a cross-sectional area of the pipe P, and a value obtained by dividing the flow rate value by the cross-sectional area is the flow velocity of the fluid flowing through the pipe P.

The second measurement unit 135 is a measurement unit configured to calculate the flow rate of the fluid in the pipe P by the pulse-Doppler system. The second measurement unit 135 controls the ultrasonic element 15B to transmit a pulsed ultrasonic signal from the ultrasonic element 15B toward the pipe P, receives an ultrasonic signal reflected by the reflector contained in the fluid, and measures a frequency shift $\Delta f$ between the transmitted ultrasonic signal and the reflected ultrasonic signal. That is, the frequency shift $\Delta f$ is a measurement value measured by the second measurement unit 135.

Figure 6:
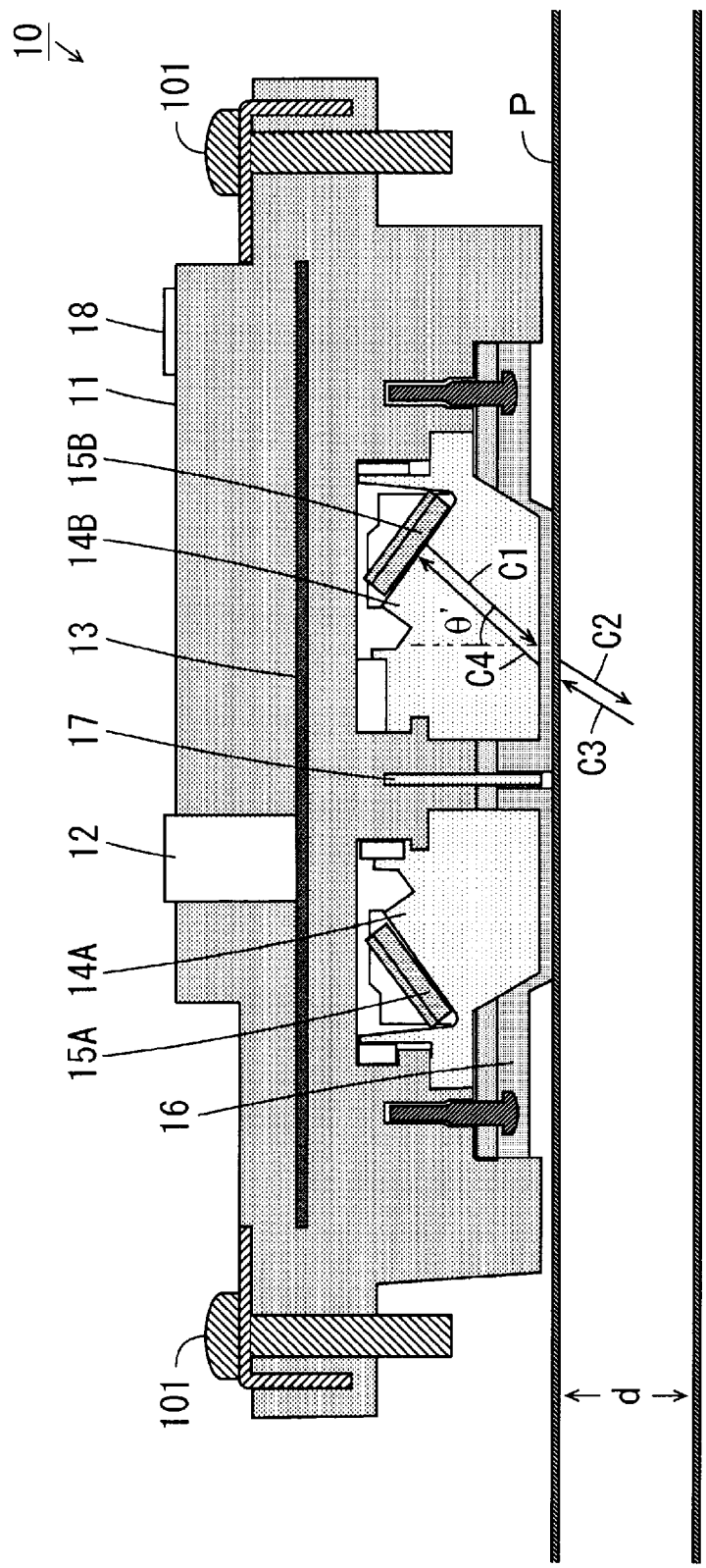
FIG. 6 is a diagram for describing an operation of the sensor head in a pulse-Doppler system.

An operation of the sensor head 10 when the second measurement unit 135 measures the measurement value will be described with reference to FIG. 6. First, the second measurement unit 135 controls the ultrasonic element 15B to transmit a pulsed ultrasonic signal of several pulses from the ultrasonic element 15B toward the pipe P. At this time, the second measurement unit 135 controls the ultrasonic element 15B such that the ultrasonic signal is transmitted at a frequency f stored in the storage unit 131. The ultrasonic signal transmitted by the ultrasonic element 15B propagates through the wedge material 14B in a direction of an arrow C1, passes through the acoustic couplant 16, enters the fluid in the pipe P, and propagates through the fluid in the pipe P in a direction of an arrow C2.

Here, the fluid flowing through the pipe P contains microbubbles as the reflector that reflects the ultrasonic signal transmitted from the ultrasonic element 15B under the control of the second measurement unit 135. The microbubble is, for example, a minute bubble having a diameter between 10 μm and 50 μm. Examples of the fluid that is likely to contain the microbubbles include a coolant liquid such as water-soluble cutting oil for cooling a processing point of a machine tool. Since the coolant liquid contains a surfactant and is circulated and used again after being in contact with air, a large number of microbubbles are generated in the coolant liquid flowing through the pipe P.

The ultrasonic signal, propagated through the fluid in the pipe P in the direction of the arrow C2 and reflected by the microbubbles as the reflector, propagates through the fluid in the pipe P in a direction of an arrow C3. The ultrasonic signal is reflected in multiple directions by the microbubbles contained in the fluid, and an ultrasonic signal that has the highest intensity among the reflected ultrasonic signals propagates in the direction of the arrow C3. The ultrasonic signal propagating in the direction of the arrow C3 passes through the acoustic couplant 16, propagates through the wedge material 14B in a direction of an arrow C4, and is received by the ultrasonic element 15B. In this manner, the second measurement unit 135 measures the frequency shift Δf that is a difference between a frequency of the ultrasonic signal transmitted by the ultrasonic element 15B and a frequency of the ultrasonic signal received by the ultrasonic element 15B. The frequency shift Δf is proportional to a moving velocity of the microbubbles contained in the fluid in the pipe P, that is, the flow velocity of the fluid in the pipe P.

In this manner, the measurement for calculating the flow rate by the pulse-Doppler system requires the ultrasonic element that transmits the ultrasonic signal toward the fluid and the ultrasonic element that receives the ultrasonic signal reflected by the reflector contained in the fluid. As described above, the reception accuracy of the ultrasonic signal is higher when the ultrasonic element that transmits the ultrasonic signal and the ultrasonic element that receives the ultrasonic signal are the same in the pulse-Doppler system, and thus, the ultrasonic element 15B transmits and receives the ultrasonic signal. In particular, since the ultrasonic element used in the pulse-Doppler system is the composite element in the embodiment, the measurement accuracy is improved. Note that the number of ultrasonic elements for the pulse-Doppler system is not limited to one, and two or more ultrasonic elements may be used. In a case where the ultrasonic element that receives the ultrasonic signal is provided separately from the ultrasonic element that transmits the ultrasonic signal in the pulse-Doppler system, it is unnecessary to consider the reverberation, and thus, the reception accuracy is improved.

In addition, the ultrasonic element 15B is controlled by both the measurement for the propagation time difference system, that is, the measurement by the first measurement unit 132, and the measurement for the pulse-Doppler system, that is, the measurement by the second measurement unit 135. Thus, the measurement for the propagation time difference system and the measurement for the pulse-Doppler system are performed by the two ultrasonic elements 15, but other ultrasonic elements may be provided for measurement by each of the systems. For example, it may be configured such that the first measurement unit 132 controls a pair of ultrasonic elements to measure a measurement value, and the second measurement unit 135 measures a measurement value using a pair of ultrasonic elements or one ultrasonic element different from the pair of ultrasonic elements controlled by the first measurement unit 132.

Furthermore, the second measurement unit 135 controls the ultrasonic element 15B to measure the frequency shift Δf as the measurement value, but the ultrasonic element 15A may be used. In the embodiment, the housing part 11 is small, and thus, the distance between the control unit 13 and the ultrasonic element 15 is small. In particular, the power supply circuit 40 is provided in the vicinity of a portion of the control unit 13 to which the connector 12 is connected, and the frequency of the ultrasonic signal received by the ultrasonic element is easily affected by the power supply circuit 40. Thus, the second measurement unit 135 controls the ultrasonic element 15B having a relatively large distance from the connector 12 to measure the frequency shift Δf in the embodiment.

Returning to FIG. 3, the control unit 13 includes the second calculation unit 136. The second calculation unit 136 calculates the flow rate of the fluid in the pipe P by the pulse-Doppler system. More specifically, a flow rate value V2 is calculated by the following Formula (2) including the frequency shift Δf, which is a measurement value measured by the second measurement unit 135, as a parameter. The frequency f is the frequency of the ultrasonic signal transmitted by the ultrasonic element 15B, and is stored in the storage unit 131 as described above.

[Formula 2]

$$V2 = \frac{C'}{2\sin\theta'} \cdot \frac{\Delta f}{f} \cdot \frac{d^2\pi}{4} \cdot \lambda \qquad (2)$$

In Formula (2), the frequency f is the frequency of the ultrasonic signal transmitted from the ultrasonic element 15B under the control of the second measurement unit 135, and is stored in the storage unit 131 as described above. In addition, the velocity C', the incident angle θ', the incident angle θ, and the Blasius coefficient are known and stored in advance in the storage unit 131 of the control unit 13, and the inner diameter d is the parameter input by the user as described above. Therefore, the second calculation unit 136 calculates the flow rate value V2 based on the frequency shift Δf, which is the measurement value measured by the second measurement unit 135, the parameter for identifying the inner diameter d of the pipe, and the values stored in advance in the storage unit 131.

Note that Formula (2) is simplified such that the flow rate value V2 is calculated by a certain measured frequency shift Δf for contrast between the flow rate value V2 by the second calculation unit 136 and the calculation of the flow rate value V1 by the first calculation unit 134. In the embodiment, in order to improve the accuracy of the flow rate value V2, the second measurement unit 135 measures the frequency shifts Δf at a plurality of points of the fluid in the pipe P, and the second calculation unit 136 calculates the flow rate value V2 based on the plurality of measured frequency shifts Δf.

Figure 7:
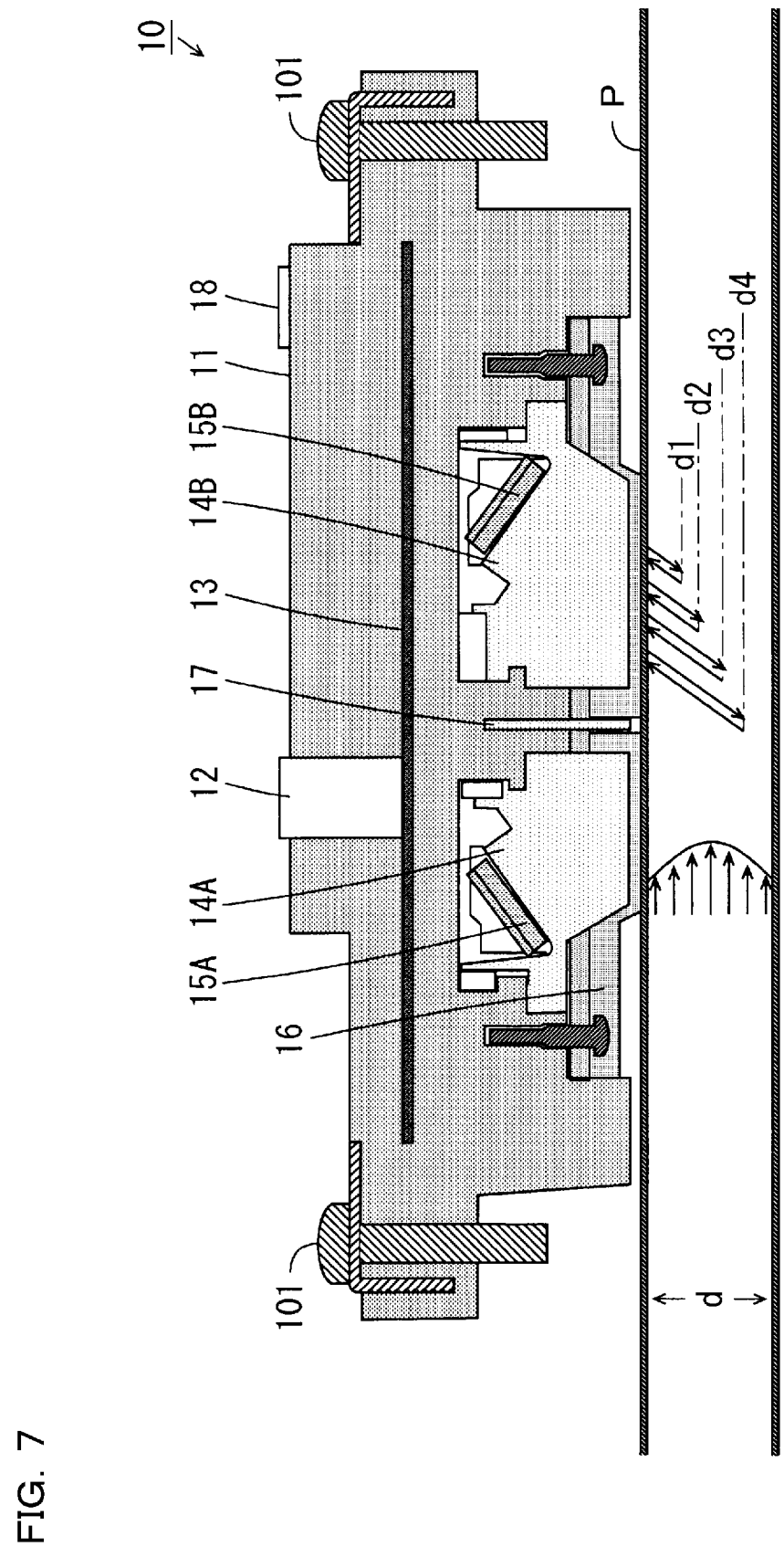
FIG. 7 is a view for describing a more specific operation of the sensor head in the pulse-Doppler system.

Details of the measurement of the frequency shift Δf by the second measurement unit 135 will be described with reference to FIG. 7. FIG. 7 illustrates a more specific operation of the sensor head 10 in the pulse-Doppler system. As illustrated in FIG. 7, the fluid does not flow at a uniform velocity in a flow path of the pipe P, but flows at a predetermined velocity distribution. A flow velocity of the fluid flowing in the vicinity of the center of the flow path of the pipe P is higher than a flow velocity of the fluid flowing in the vicinity of the inner wall of the pipe P. The frequency shift Δf measured by the second measurement unit 135 is a measurement value corresponding to one point in a direction of the inner diameter d of the fluid in the pipe P. Thus, when the flow rate value V2 is calculated based on only one frequency shift Δf, the calculated flow rate value V2 differs depending on whether the frequency shift Δf is a frequency shift Δf of a frequency signal reflected in the vicinity of the center of the pipe P or a frequency shift Δf of a frequency signal reflected in the vicinity of the inner wall of the pipe P.

Here, in the pulse-Doppler system, time until the ultrasonic wave transmitted by the ultrasonic element 15B reaches the microbubble and time until the ultrasonic wave reflected by the microbubble reaches the ultrasonic element 15B are different for each position where the microbubble flows in the radial direction of the pipe P. Therefore, the second measurement unit 135 measures the frequency shift $\Delta f$ for each time from the transmission of the ultrasonic signal from the ultrasonic element 15B to the reception of the ultrasonic signal reflected by the microbubble by the ultrasonic element 15B. Note that the position where microbubble flows in the radial direction of the pipe P is referred to as a depth at which the microbubble flows hereinafter.

Figure 8:
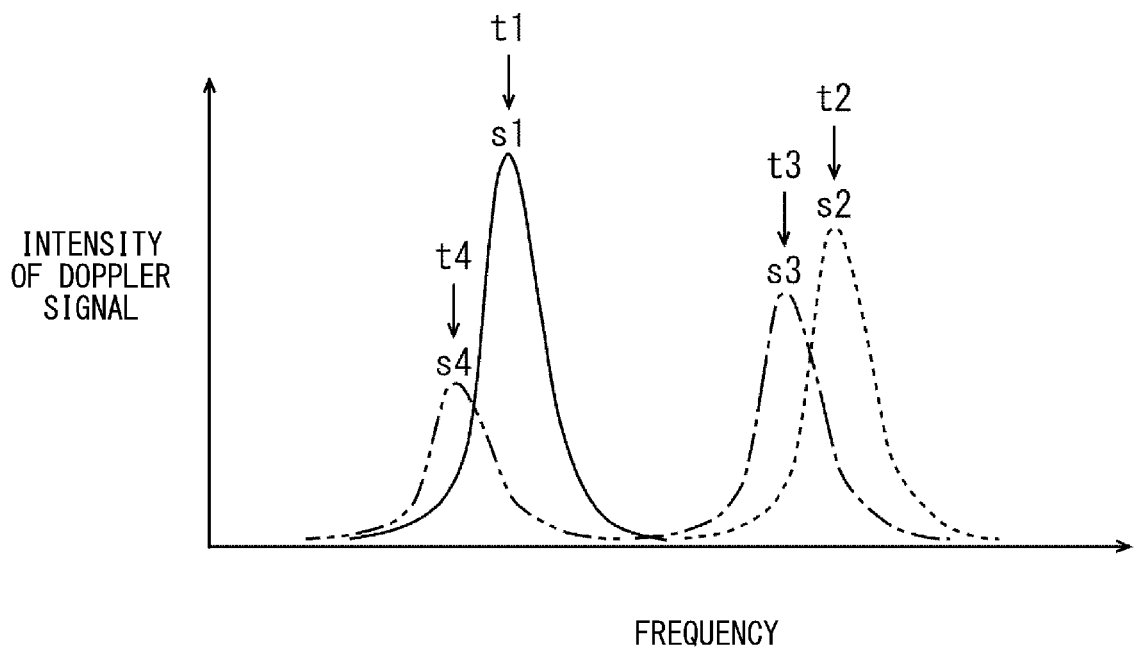
FIG. 8 is a view illustrating a Doppler signal detected for each time.

FIG. 8 is a view illustrating a Doppler signal as an ultrasonic signal detected for each time. The horizontal axis in FIG. 8 indicates a frequency. The vertical axis in FIG. 8 indicates an intensity of the Doppler signal. In the example of FIG. 8, a plurality of Doppler signals s1 to s4 are indicated by a solid line, a dotted line, a one-dot chain line, and a two-dot chain line, respectively. The Doppler signals s1 to s4 are Doppler signals detected for ultrasonic waves reflected by microbubbles flowing at the depths d1 to d4 in FIG. 7, respectively, and are detected at a plurality of different times t1 to t4, respectively. The second measurement unit 135 sets centroid positions of the Doppler signals s1 to s4 as Doppler frequencies corresponding to the depths d1 to d4, respectively, and measures the frequency shifts $\Delta f$ respectively corresponding to the depths d1 to d4. The second calculation unit 136 calculates the flow velocity of the microbubble at each of the depths d1 to d4 based on the plurality of measured frequency shifts $\Delta f$. Accordingly, the second calculation unit 136 can identify the velocity distribution of the fluid in the pipe P. Furthermore, the second calculation unit 136 averages the identified velocity distribution of the fluid, and multiplies the averaged flow velocity as the flow velocity of the fluid in the pipe P by a cross-sectional area to calculate the flow rate value V2.

As described above, the position of the fluid can be spatially resolved, and the velocity distribution of the fluid can be identified in the pulse-Doppler system. In the embodiment, the flow velocity of the fluid is calculated for each of the depths d1 to d4, but the number of depth points may be appropriately determined according to the diameter of the pipe P, the processing speed of the control unit 13, or the like.

As described above, the flow rate can be calculated with high accuracy even when the density of microbubbles contained in the fluid is relatively high in the pulse-Doppler system. However, when the density of microbubbles is higher than a value v2 in FIG. 10 to be described later, the accuracy of calculating the flow rate decreases. The reason thereof will be described below.

Returning to FIG. 3, the control unit 13 includes the cycle skip determination unit 137. The cycle skip determination unit 137 determines whether a cycle skip occurs in a Doppler frequency measured by the second measurement unit 135. The cycle skip is a phenomenon in which a shift amount for not an original phase but a phase after one cycle from the original phase is calculated as a frequency shift in a case where a shift amount for a frequency of a transmitted ultrasonic wave is larger than that for one cycle of a phase in the calculation of the Doppler frequency. As in the embodiment, the cycle skip relatively frequently occurs in a case where an interval between phases of an ultrasonic wave is short, that is, in a case where the frequency of the ultrasonic waves is high. When the cycle skip occurs, a Doppler frequency lower than an original value is calculated, and thus, a flow rate less than an original value is calculated. Therefore, the cycle skip determination unit 137 determines that the cycle skip has occurred when the flow velocity calculated corresponding to each of the depths d1 to d4 deviates from a previous value by a predetermined value or more. The flow rate value V2 calculated based on the frequency shift of corresponding to the Doppler frequency for which the cycle skip determination unit 137 determines that the cycle skip has occurred is treated as a flow rate value with low stability. As an example, in the pulse-Doppler mode in which the flow rate value V2 is output to the display 30, the second calculation unit 136 outputs, to the display 30, a flow rate value calculated based on a previous measurement value as the flow rate value V2, instead of the flow rate value V2 with low stability for which it is determined that the cycle skip has occurred. In addition, in the hybrid mode, the flow rate value combining unit 139 decreases a combination ratio of the flow rate value V2 with low stability for which it is determined that the cycle skip has occurred.

Note that the second calculation unit 136 may be configured to correct the flow rate value V2 when it is determined that the cycle skip has occurred. For example, the second calculation unit 136 may correct a flow rate value to a value of the time when no cycle skip occurs. In the correction, the correction may be performed by adding a correction value defined to correspond to a frequency of an ultrasonic wave, or the correction may be performed by multiplying a correction factor defined to correspond to a frequency of an ultrasonic wave.

The microbubble sensing unit 138 senses the density of microbubbles contained in the fluid based on a predetermined index. A cycle of the sensing can be set by the user performing an input operation on operation unit 35 in FIG. 2. The index for sensing the density of microbubbles includes, for example, an intensity of a Doppler signal or a width of the Doppler signal detected for each depth in the pipe P. In addition, a table indicating a relationship between the density of microbubbles sensed by the microbubble sensing unit 138 and a correction amount is stored in advance in the storage unit 131.

Figure 9:
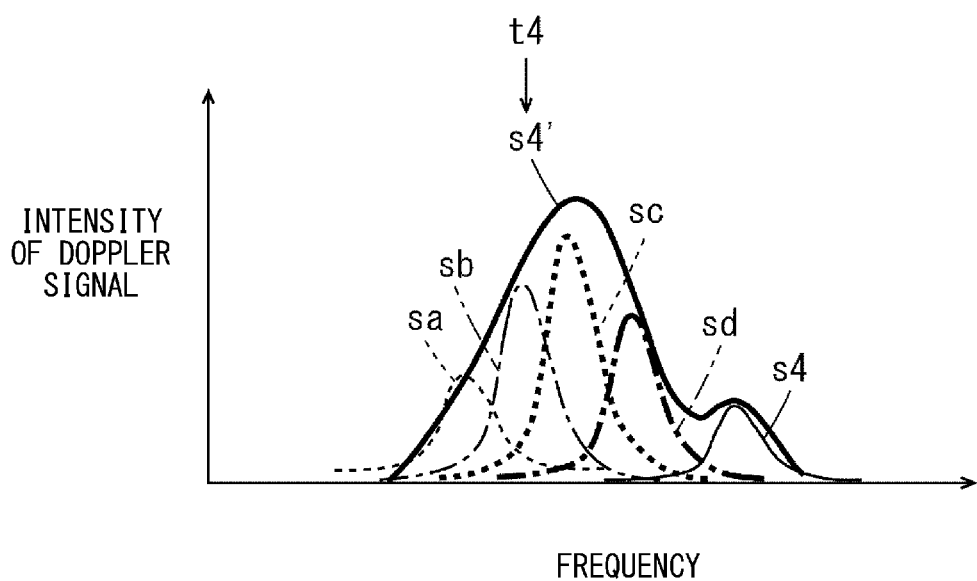
FIG. 9 is a view illustrating Doppler signals detected when the density of microbubbles is high.

The horizontal axis in FIG. 9 indicates a frequency. The vertical axis in FIG. 9 indicates an intensity of a detected Doppler signal.

In the example of FIG. 9, the Doppler signal detected at time t4 is considered. In this case, the Doppler signal s4 for the ultrasonic wave reflected by the microbubble flowing at the depth d4 in FIG. 7 is originally received (see FIG. 8).

However, when the density of microbubbles is high, an attenuation amount of the ultrasonic wave increases, and thus, the intensity of the Doppler signal for the ultrasonic wave from the microbubble flowing at the depth d4 decreases. In addition, a reflection amount of the ultrasonic wave from microbubbles flowing at positions shallower than the depth d4 increases. Here, when the ultrasonic wave is diffusely reflected by the microbubbles flowing at positions shallower than the depth d4, the diffusely reflected ultrasonic wave arrives at the ultrasonic element 15 with a delay as compared with the case of direct reflection. A signal of the ultrasonic wave that is diffusely reflected in this manner and reaches the ultrasonic element 15 is referred to as a false signal.

When the diffusely reflected ultrasonic wave arrives at the same time t4 as the ultrasonic wave reflected by the microbubble flowing through the depth d4, a Doppler signal in which the Doppler signal s4 to be originally detected and the false signal overlap is detected. In the example of FIG. 9, the Doppler signal s4 and false signals sa to sd overlap, so that a Doppler signal s4' that is larger and thicker than the Doppler signal s4 is detected. The false signals sa to sd are illustrated by a thin dotted line, a thin one-dot chain line, a thick dotted line, and a thick one-dot chain line, respectively, to facilitate viewability. In addition, the Doppler signals s4 and s4' are illustrated by a thin solid line and a thick solid line, respectively.

In this case, a Doppler frequency corresponding to the depth d4 is measured based on the Doppler signal s4' instead of the Doppler signal s4. When the Doppler frequency measured in this manner is used, a calculated average flow velocity of the fluid is lower than an original value. Therefore, a calculated flow rate of the fluid is also less than an original value. As a result, the accuracy in calculation of the flow rate decreases.

In order to prevent such a decrease in accuracy, the storage unit 131 stores the table indicating the relationship between the correction amount of a flow rate value calculated based on a false signal and the density of microbubbles sensed by the microbubble sensing unit 138. The second calculation unit 136 corrects the flow rate value based on the density of microbubbles and the table stored in the storage unit 131.

Returning to FIG. 3, the control unit 13 includes the flow rate value combining unit 139. The flow rate value combining unit 139 combines the flow rate value V1 and the flow rate value V2 at a predetermined ratio in the hybrid mode. In the hybrid mode of the embodiment, a period during which the first measurement unit 132 operates to calculate the flow rate value V1 and a period during which the second measurement unit 135 operates to calculate the flow rate value V2 are both 150 ms, and the measurement by the first measurement unit 132 and the measurement by the second measurement unit 135 are alternately executed. The flow rate value combining unit 139 combines the flow rate value V1 and the flow rate value V2, and outputs a combined result to the display 30 as a flow rate value V4. Note that both the operation period of the first measurement unit 132 and the operation period of the second measurement unit 135 are 150 ms in the embodiment, but the embodiment is not limited thereto. The operation period of the first measurement unit 132 or the operation period of the second measurement unit 135 may be shorter than 150 ms or longer than 150 ms. In addition, the operation period of the first measurement unit 132 and the operation period of the second measurement unit 135 may have different lengths.

Figure 10:
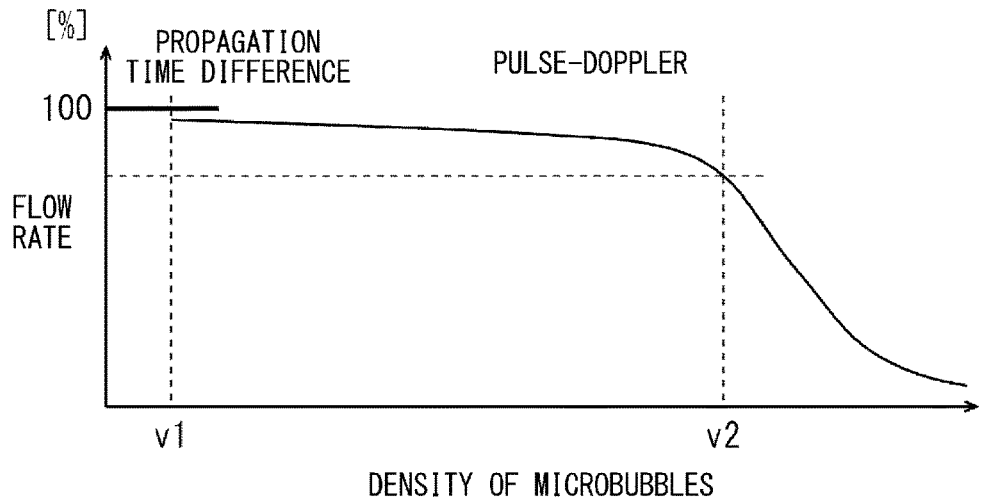
FIG. 10 is a view illustrating flow rates of a fluid calculated by the propagation time difference system and the pulse-Doppler system.

FIG. 10 is a view illustrating flow rates of a fluid calculated by the propagation time difference system and the pulse-Doppler system. The horizontal axis in FIG. 10 indicates the density of microbubbles contained in the fluid. The vertical axis in FIG. 10 indicates a relative value of a calculated flow rate value with respect to an actual flow rate of the fluid. In addition, the flow rate measured by the propagation time difference system is indicated by a thick solid line, and the flow rate measured by the pulse-Doppler system is indicated by a thin solid line.

As illustrated in FIG. 10, the flow rate of 100% is calculated in the propagation time difference system when the density of microbubbles is relatively low. However, it is difficult to calculate the flow rate when the density of microbubbles is relatively high. On the other hand, in the pulse-Doppler system, the flow rate close to 100% is calculated when the density of microbubbles is relatively high. In particular, when the density of microbubbles is between a value v1 and a value v2 higher than the value v1, the flow rate is calculated with relatively high accuracy.

Therefore, in the hybrid mode, the flow rate value combining unit 139 combines the flow rate value V1 calculated by the propagation time difference system and the flow rate value V2 calculated by the pulse-Doppler system at the predetermined ratio based on the stability of the flow rate calculation, and outputs the combined flow rate value V4 to the display 30 as the calculated flow rate value. Therefore, the switching signal is generated based on the combined flow rate value 4 in the hybrid mode, and the display lamp 37 lights up on or blinks based on the combined flow rate value V4. Note that the stability of the flow rate calculation is, for example, the intensity of the detected Doppler signal.

In addition, the flow rate value V2 calculated by the second calculation unit 136 based on the measurement value for which it is determined that the cycle skip has occurred is treated as the flow rate value with low stability of the flow rate calculation.

(3) Calculation of Flow Rate by Propagation Time Difference System

Formulas (1) and (2) will be described.

In a conventional propagation time difference system, a flow rate value V3 has been calculated by the following Formula (3).

[Formula 3]

$$V3 = \frac{C'}{2\sin\theta'} \cdot \frac{\Delta t}{1} \cdot \boxed{\frac{C\cos\theta}{2d}} \cdot \frac{d^2\pi}{4} \cdot \lambda \quad (3)$$

Formula (3) has a term surrounded by a frame, which is different from Formula (1). In Formula (3), C represents a fluid sonic velocity indicating a velocity of an ultrasonic wave in a fluid, and $\theta$ is an incident angle of the ultrasonic wave to the fluid. The velocity C corresponds to the velocity of the ultrasonic wave in the fluid. The incident angle $\theta$ is known, and thus, has been stored in the storage unit 131 similarly to other known values. However, the velocity C is a value that varies depending on a material of the fluid or a temperature of the fluid, and thus, is a parameter that needs to be input by the user. Therefore, the velocity C and the inner diameter d, which are parameters input by the user, are referred to in calculation of the flow rate value V3 by Formula (3). Therefore, when the parameter of the velocity C is different from an actual value or when the parameter of the inner diameter d is different from an actual value, the flow rate value V3 also deviates from an actual flow rate.

Since the flow rate value V3 is proportional to the velocity C and the inner diameter d in Formula (3), a difference between the flow rate value V3 and the actual flow rate is proportional to a difference between the input velocity C and the actual value and a difference between the input inner diameter d and the actual value.

As compared with Formula (3) for calculating the flow rate value V3, the flow rate value V2 is calculated by Formula (2) described above in the pulse-Doppler system. Formula (2) includes the inner diameter d as a parameter that is input by the user. Therefore, the inner diameter d, which is the parameter input by the user, is referred to in the calculation of the flow rate value V2 by Formula (2). Therefore, when the parameter of the inner diameter d is different from an actual value, the flow rate value V2 also deviates from an actual flow rate. Since the flow rate value V2 is proportional to the square of the inner diameter d in Formula (2), a difference between the flow rate value V2 and the actual flow rate is proportional to the square of a difference between the parameter of the inner diameter d and the actual value.

A relationship between the flow rate value V3 and the parameter of Formula (3) is different from a relationship between the flow rate value V2 and the parameter of Formula (2). For example, when the parameter of the inner diameter d has a difference from an actual value, the flow rate value V3 deviates from the actual flow rate in proportion to the difference, whereas the flow rate value V2 deviates from the actual flow rate in proportion to the square of the difference. Thus, even if the parameter of the inner diameter d is not changed and the actual flow rate is the same between the time when the flow rate value V3 is calculated and the time when the flow rate value V2 is calculated, a difference is likely to occur between the flow rate value V2 and the flow rate value V3. In addition, even when the parameter of the velocity C has a difference from an actual value, the flow rate value V3 deviates from an actual flow rate in proportion to the difference of the velocity C, whereas the flow rate value V2 does not deviate from an actual flow rate due to the difference of the velocity C. Thus, the difference is likely to occur between the flow rate value V3 and the flow rate value V2 even when the parameter is not changed and the actual flow rate is the same between the time when the flow rate value V2 is calculated and the time when the flow rate value V3 is calculated. In a configuration that enables the calculation of the flow rate value by the propagation time difference system using the conventional Formula (3) and the calculation of the flow rate value by the pulse-Doppler system using Formula (2), there is a problem that the flow rate value rapidly fluctuates due to the difference between the flow rate value V3 and the flow rate value V2 when a calculation system for the flow rate value is switched.

In particular, in a configuration in which the calculation of the flow rate value by the propagation time difference system and the calculation of the flow rate value by the pulse-Doppler system can be alternately executed and a flow rate value obtained by combining the respective flow rate values can be output as in the embodiment, there is a possibility that the output flow rate value changes depending on the combination ratio of the flow rate values even if there is no change in the actual flow rate. In addition, there is a possibility that the switching signal, which is the result of the comparison with the threshold, changes due to a change in the output flow rate value even if there is no change in the actual flow rate.

In particular, it is difficult to use a measurement value as the velocity C included in Formula (1). The velocity C is a sonic velocity when a flow velocity of the fluid is zero, and is a value that varies as a temperature of the fluid varies. Therefore, in order to actually measure the velocity C and improve the accuracy of the parameter of the velocity C, it is necessary for the user to measure the sonic velocity in a state in which the fluid flowing through the pipe P is stopped at the same temperature as the time when the fluid flows through the pipe P, which is very difficult.

Therefore, in the calculation of the flow rate value by the propagation time difference system of the embodiment, the flow rate value is calculated using the fluid propagation time T identified based on the propagation time ta measured by the first measurement unit 132 as the measurement value related to the velocity C. Since Formula (1) is a formula in which the velocity C in Formula (3) is identified based on the fluid propagation time T, the flow rate value V1 is a flow rate value calculated using the fluid propagation time T as the measurement value related to the velocity C. According to Formula (1), the parameter of the velocity C is not referred to since the flow rate value V1 is calculated based on the propagation time difference Δt measured by the first measurement unit 132 and the fluid propagation time T identified by the propagation time identifying unit 133 based on the propagation time ta.

Details of the identification of the velocity C included in Formula (3) based on the fluid propagation time T will be described. First, the velocity C input by the user in Formula (3) is the sonic velocity when the fluid flow velocity is zero. In the propagation time difference system, a sonic velocity in a fluid is affected by a flow velocity, and a difference generated between a propagation time when an ultrasonic wave propagates along a flow direction of the fluid and a propagation time when an ultrasonic wave propagates against the flow direction of the fluid is measured to calculate the flow velocity and a flow rate of the fluid.

At this time, a difference between the velocity C and the sonic velocity in the fluid affected by the flow velocity is minute, and thus, a value close to the flow rate calculated using the velocity C is calculated even if the flow rate is calculated using the sonic velocity in the fluid affected by the flow velocity instead of the velocity C.

In the embodiment, a velocity Ca in the fluid of the ultrasonic signal transmitted from the ultrasonic element 15A to the ultrasonic element 15B in the measurement by the first measurement unit 132 is treated as a value approximate to the velocity C. Here, the velocity Ca is calculated based on a correspondence relationship among a length of a path, a propagation time of the ultrasonic wave in the path, and a propagation velocity of the ultrasonic wave in the path. The path corresponding to the velocity Ca is a path of the fluid in the pipe P out of the path through which the ultrasonic signal propagates from the first ultrasonic element 15A to the second ultrasonic element 15B, and thus is represented by 2d/cos θ. In addition, the propagation time corresponding to the velocity Ca is the fluid propagation time $\tau_4$ identified as the fluid propagation time T by the propagation time identifying unit 133 based on the propagation time ta measured by the first measurement unit 132.

Thus, in the embodiment, the propagation time identifying unit 133 that identifies the fluid propagation time $\tau_4$ based on the propagation time ta measured by the first measurement unit 132 is provided in addition to the first measurement unit 132 that measures the propagation time difference Δt. Since the velocity Ca is calculated based on the correspondence relationship among the length of the path, the propagation time of the path, and the propagation velocity of the path, the velocity Ca is a value obtained by dividing 2d/cos θ, which is a length of the corresponding path, by the fluid propagation time T. In the embodiment, the velocity Ca is a value substituted for the velocity C. Therefore, the velocity C included in Formula (3) is replaced with the velocity Ca, that is, the value obtained by dividing 2d/cos θ by T, and Formula (3) is converted into Formula (1). Here, since the fluid propagation time T is a value identified based on the propagation time ta measured by the first measurement unit 132, the fluid propagation time T is the measurement value. Thus, to calculate the flow rate by Formula (1) is to calculate the flow rate using the fluid propagation time T as the measurement value related to the velocity C. In addition, Formula (1) can be said to be a formula in which the velocity C in Formula (3) is identified using the fluid propagation time T as the measurement value.

As illustrated in Formula (1), the flow rate value V1 calculated by Formula (1) is calculated using the measurement values except for the inner diameter d, and is proportional to the square of the inner diameter d. The flow rate value V2 calculated by Formula (2) is also calculated using the measurement values except for the inner diameter d and is proportional to the square of the inner diameter d. Thus, both the flow rate value V1 and the flow rate value V2 similarly fluctuate depending on an error in the parameter of the inner diameter d. Therefore, in a case where the parameter of the inner diameter d when the flow rate value V1 is calculated is the same as the parameter of the inner diameter d when the flow rate value V2 is calculated and the actual flow rate is the same, the difference is less likely to occur between the flow rate value V1 and the flow rate value V2. Thus, in the configuration that enables the calculation of the flow rate value by the propagation time difference system and the calculation of the flow rate value by the pulse-Doppler system, the fluctuation of the flow rate value when the system is switched can be reduced.

Note that the fluid propagation time T, which is the measurement value related to the velocity C, is preferably a value obtained by dividing 2d/cos θ, which is the path length of the ultrasonic wave in the fluid, by a velocity approximate to the velocity C, that is, a value approximate to a time for which the ultrasonic signal propagating at the velocity C propagates through the path length of the ultrasonic wave in the fluid. When such a value is used as the measurement value related to the velocity C, Formula (3) is converted into a calculation formula in which a flow rate value to be calculated is proportional to the square of the inner diameter d similarly to Formula (1), and the relationship of the flow rate value with respect to the inner diameter d is the same as that in Formula (2) of the pulse-Doppler system. Therefore, it is possible to reduce the fluctuation of the flow rate value due to the error in the parameter at the time of switching between the calculation by the propagation time difference system and the calculation by the pulse-Doppler system.

The fluid propagation time T may be the fluid propagation time $\tau_4$ calculated by subtracting the wedge propagation time $\tau_1$, the couplant propagation time $\tau_2$, and the pipe propagation time $\tau_3$ from the propagation time tb other than the fluid propagation time $\tau_4$ obtained by subtracting the wedge propagation time $\tau_1$, the couplant propagation time $\tau_2$, and the pipe propagation time $\tau_3$ from the propagation time ta. In addition, a value obtained by subtracting the wedge propagation time $\tau_1$, the couplant propagation time $\tau_2$, and the pipe propagation time $1_3$ from an average value of the propagation time ta and the propagation time tb may be used.

(3) Flow Rate Calculation Processing

Figure 3:
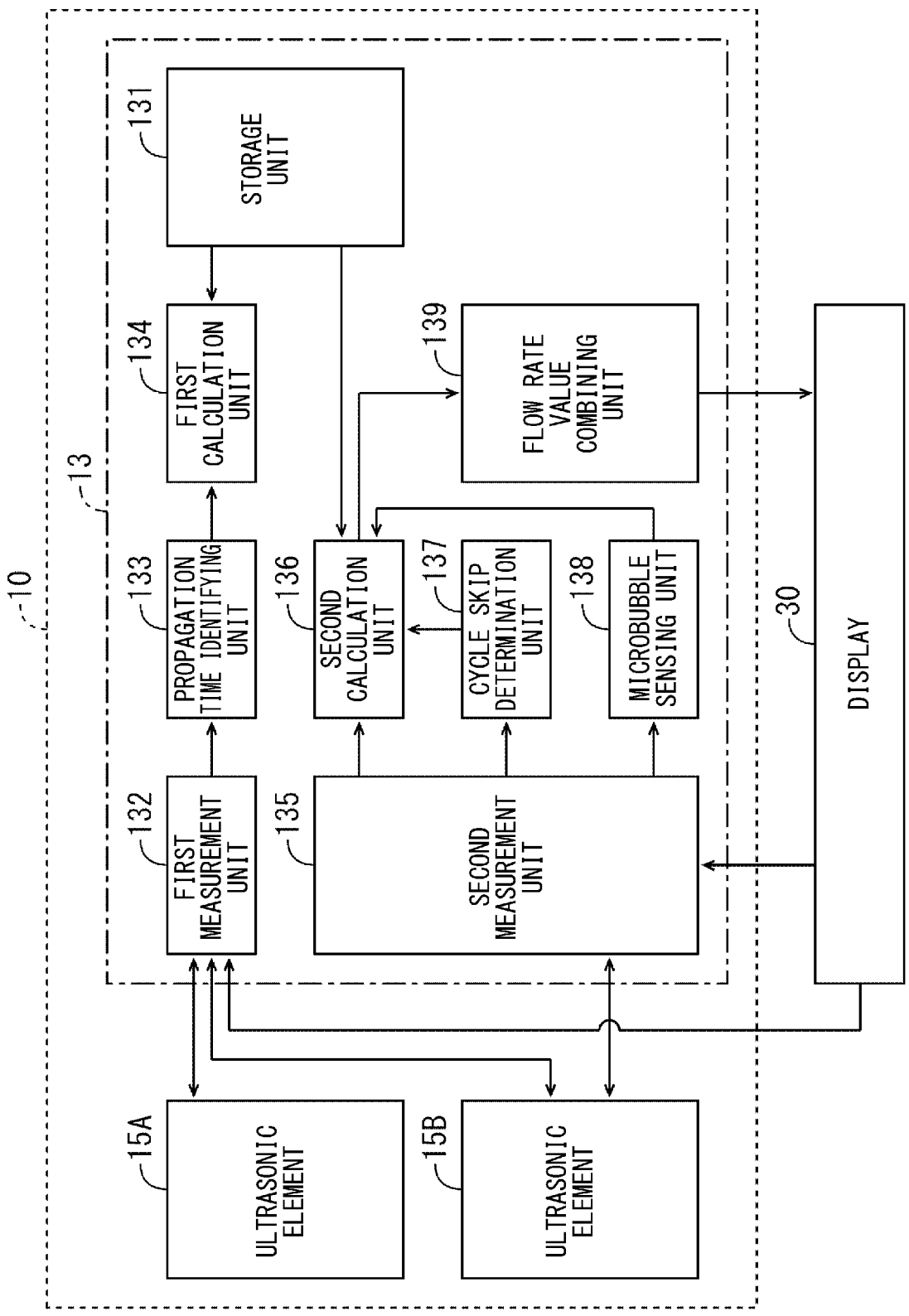
FIG. 3 is a block diagram illustrating a configuration of a control unit in FIG. 2.
Figure 11:
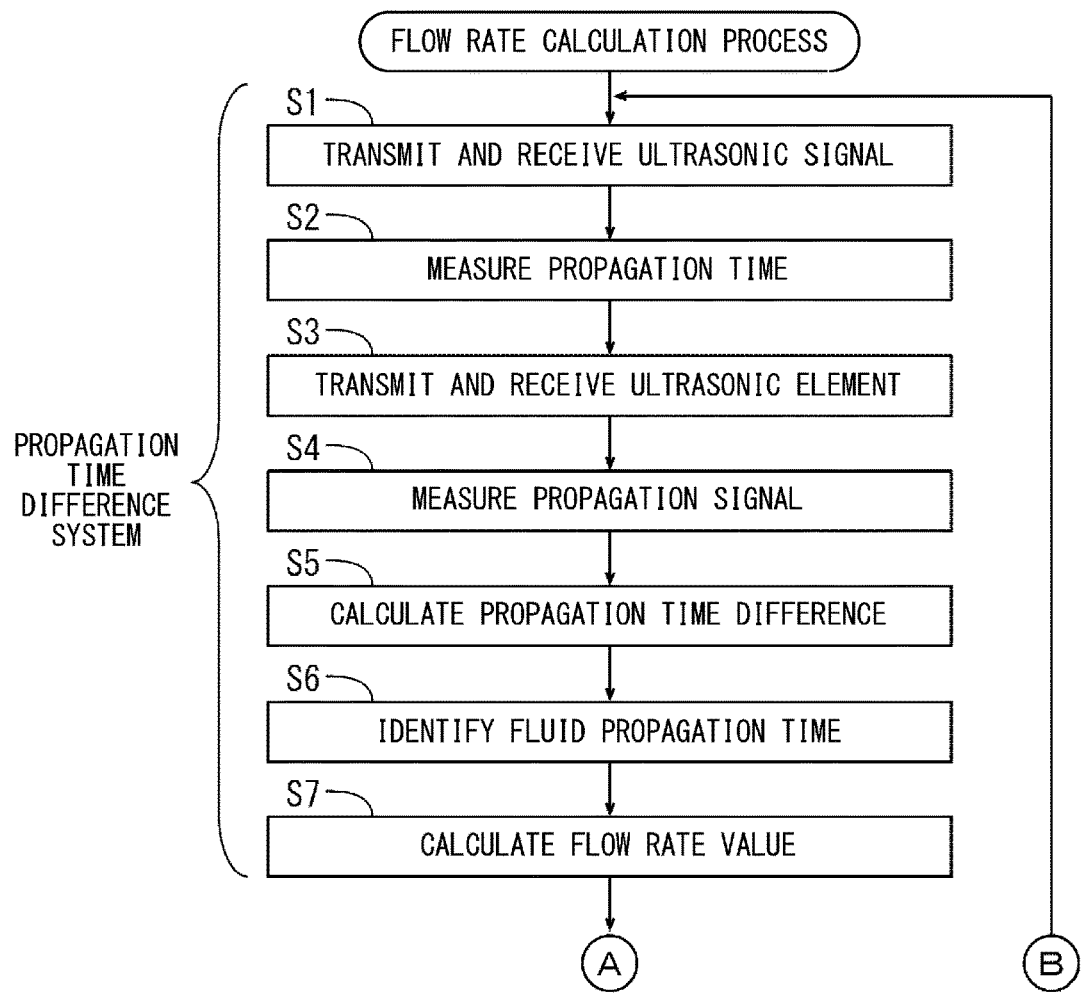
FIG. 11 is a flowchart illustrating an example of an algorithm of flow rate calculation processing executed in a hybrid mode by the control unit of FIG. 3.
Figure 12:
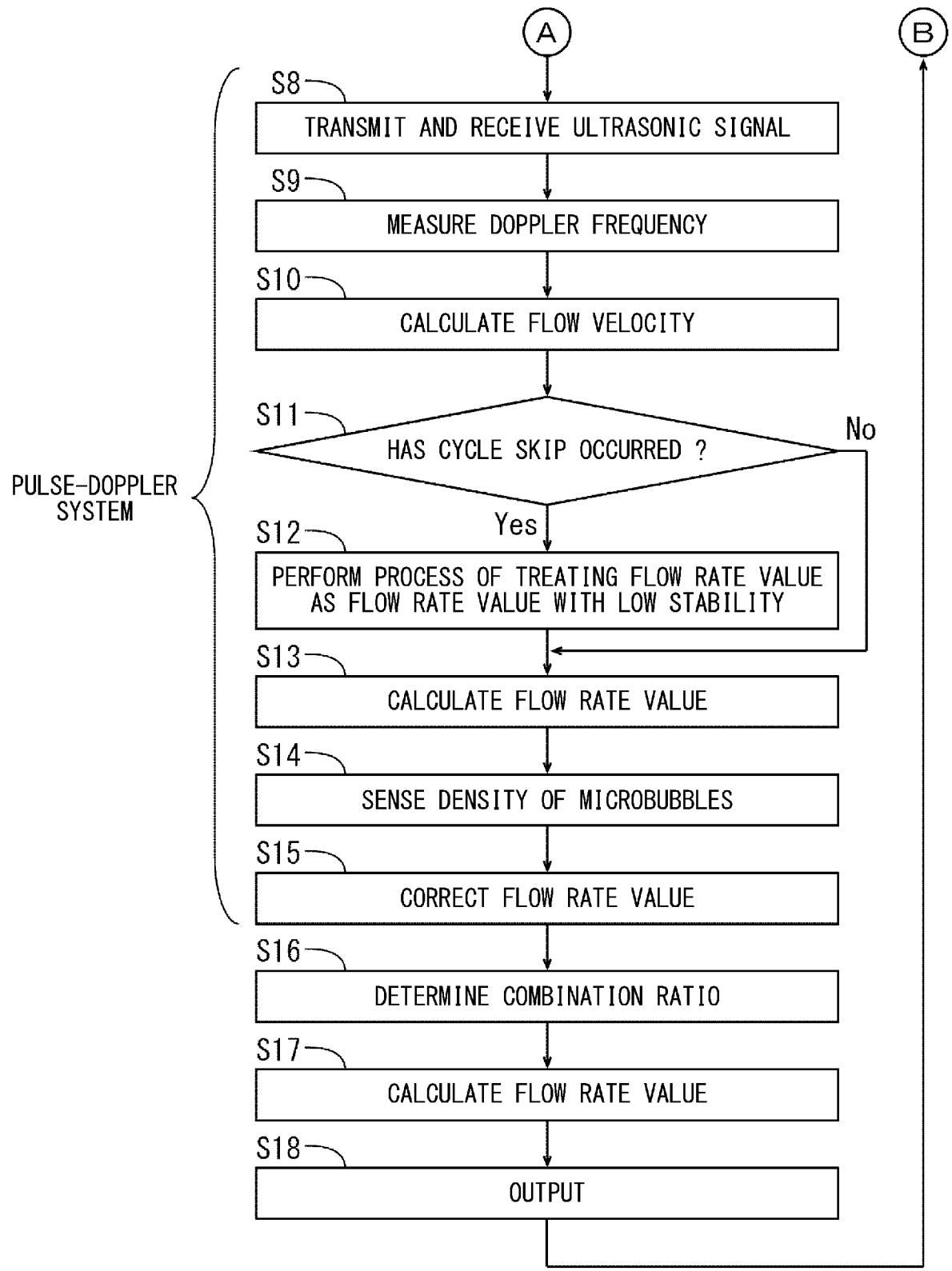
FIG. 12 is a flowchart illustrating the example of the algorithm of the flow rate calculation processing executed in the hybrid mode by the control unit of FIG. 3.

FIGS. 11 and 12 are flowcharts illustrating an example of an algorithm of flow rate calculation processing executed in the hybrid mode by the control unit 13 in FIG. 3. Hereinafter, the flow rate calculation processing in the hybrid mode will be described using the control unit 13 of FIG. 3 and the flowcharts of FIGS. 11 and 12.

In the flowchart illustrated in FIG. 11, the flow rate value V1 is calculated by the propagation time difference system.

First, the first measurement unit 132 controls the ultrasonic element 15A to transmit an ultrasonic signal, and controls the ultrasonic element 15B to receive the ultrasonic signal transmitted from the ultrasonic element 15A (step S1). Next, the first measurement unit 132 measures the propagation time ta of the ultrasonic signal from the ultrasonic element 15A to the ultrasonic element 15B in step S1 (step S2).

Thereafter, the first measurement unit 132 controls the ultrasonic element 15B to transmit an ultrasonic signal, and controls the ultrasonic element 15A to receive the ultrasonic signal (step S3). Next, the first measurement unit 132 measures the propagation time tb of the ultrasonic signal from the ultrasonic element 15B to the ultrasonic element 15A in step S3 (step S4). Either steps S1 and S2 or steps S3 and S4 may be executed first.

Subsequently, the first measurement unit 132 measures the propagation time difference Δt based on the propagation times measured in steps S2 and S4 (step S5). The propagation time identifying unit 133 identifies the fluid propagation time 14 based on the propagation time to measured in step S2 (Step S6). Furthermore, the first calculation unit 134 calculates the flow rate value V1 of the fluid flowing through the pipe P based on the propagation time difference Δt calculated in step S5, the fluid propagation time 14 identified in step S6 as the fluid propagation time τ, and Formula (1) (step S7). Steps S1 to S7 correspond to processing in the propagation time difference system.

After step S7, the second measurement unit 135 controls the ultrasonic element 15B so as to sequentially transmit and receive a pulsed ultrasonic signal to and from the ultrasonic element 15B (step S8). Next, the second measurement unit 135 measures the frequency shift Δf which is a difference between a frequency of the ultrasonic signal transmitted in step S8 and a Doppler frequency of the received ultrasonic signal (step S9). In addition, the second calculation unit 136 calculates a flow velocity of the fluid flowing through the pipe P based on the frequency shift Δf measured in step S9 and Formula (2) (step S10).

The cycle skip determination unit 137 determines whether a cycle skip has occurred in the frequency shift corresponding to each of the depths d1 to d4 (step S11). When it is determined that the cycle skip has not occurred, the process in step S13 is performed. When it is determined that the cycle skip has occurred, the flow rate value V2 output as a flow rate value by the pulse-Doppler system, that is, the flow rate value V2 corrected in step S15 to be described later is treated as a flow rate value with low stability (step S12). The second calculation unit 136 averages a flow velocity in the pipe P based on a flow velocity distribution identified based on flow velocities at the depths d1 to d4, and calculates a flow rate based on the averaged flow velocity. That is, the flow rate value corresponding to Formula (2) is calculated in steps S10 and S13.

The microbubble sensing unit 138 senses the density of microbubbles contained in the fluid at set cycles (step S14). Step S14 may be executed in parallel with steps S8 to S10, or may be executed before step S11. The second calculation unit 136 corrects the flow rate value V2 calculated in step S13 based on the density of microbubbles sensed in step S14 and a predetermined table (step S15). Steps S8 to S15 correspond to processing in the pulse-Doppler system. In the hybrid mode, either steps S1 to S7 or steps S8 to S15 may be executed first.

Note that both the determination as to whether the cycle skip has occurred, which is executed in step S11, and the sensing of the density of the microbubbles contained in the fluid, which is executed in step S14, are processes configured to further improve the accuracy of the flow rate calculated by the pulse-Doppler system in the embodiment. Therefore, the processes in steps S11 and S14 are not limited to the processing order illustrated in FIG. 12 as long as results thereof can be reflected in the flow rate calculated by the pulse-Doppler system.

After step S15, the flow rate value combining unit 139 determines a combination ratio between the flow rate value V1 calculated in step S7 and the flow rate value V2 calculated in step S15 based on the stability of the flow rate calculation such as an intensity of a Doppler signal detected in step S8 (step S16). Subsequently, the flow rate value combining unit 139 combines the flow rate value V1 calculated in step S7 and the flow rate value V2 corrected in step S15 at the combination ratio determined in step S16 to calculate the flow rate value V4 of the fluid flowing through the pipe P (step S17). Thereafter, the flow rate value combining unit 139 outputs the flow rate value V4 calculated in step S17 to the control unit 33 of the display 30 (step S18), and returns to step S1. The control unit 33 of the display 30 compares the flow rate output by the algorithm illustrated in FIGS. 11 and 12 with the predetermined threshold determined in advance, and generates the switching signal.

In the propagation time difference mode, steps S1 to S7 are executed, and the flow rate value V1 calculated in step S7 is output to the display 30 in step S18. The control unit 33 of the display 30 compares the flow rate value V1 calculated in step S7 with the predetermined threshold. Although the flow rate value V1 is calculated by Formula (1) in the propagation time difference system in any mode in the embodiment, it may be configured such that the flow rate value V3 is calculated by Formula (3) in the propagation time difference system in the propagation time difference mode. In this case, steps S1 to S5 are executed, and step S6 is not executed.

On the other hand, in the pulse-Doppler mode, steps S8 to S15 are executed without executing steps S1 to S7, S16, and S17, and then, step S18 of outputting the flow rate value V2 calculated in step S15 to the display 30 is executed. The control unit 33 of the display 30 compares the flow rate value V2 corrected in step S15 with the predetermined threshold determined in advance.

(4) Effects

In the ultrasonic flow sensor 100 according to the embodiment, the ultrasonic element 15A transmits and receives the ultrasonic signal. In addition, the ultrasonic element 15B transmits and receives the ultrasonic signal. In the propagation time difference system, the flow rate of the fluid flowing through the pipe P is calculated by the first calculation unit 134 based on the propagation time difference of the ultrasonic signal between the ultrasonic element 15A and the ultrasonic element 15B. In the pulse-Doppler system, the flow rate of the fluid flowing through the pipe P is calculated by the second calculation unit 136 based on the frequency shift of the ultrasonic signal received by the ultrasonic element 15B when the ultrasonic element 15B transmits the pulsed ultrasonic signal.

The flow rate in the propagation time difference system is calculated using Formula (1) in which a value corresponding to an ultrasonic velocity in the fluid is identified based on the measurement value such that a relationship between a flow rate and a value, which is included in a calculation formula and to be input by the user, is identical to a relationship between a flow rate and a value which is included in a calculation formula and to be input by the user.

In the known Calculation Formula (3) used for calculation of the flow rate by the propagation time difference system and the known Calculation Formula (2) used for calculation of the flow rate by the pulse-Doppler system, input values to be referred to are different, and thus, the degree of dependence of the value to be input by the user on the calculated flow rate differs between both the systems. However, a parameter corresponding to the ultrasonic velocity in the fluid is identified based on the value measured by the sensor head 10 according to this configuration, and thus, the degree of dependence of the value to be input by the user on the calculated flow rate is the same between both the systems. As a result, when the flow rate of the fluid flowing through the pipe P is the same and the parameter set by the user is the same, a difference hardly occurs between the flow rate calculated by the propagation time difference system and the flow rate calculated by the pulse-Doppler system. Therefore, when the parameter is the same and the flow rate flowing through the pipe P does not change, the possibility that the calculated flow rate discontinuously fluctuates is reduced. This can improve the practicality of the ultrasonic flow sensor 100.

Furthermore, in the hybrid mode, the flow rate value combining unit 139 determines the combination ratio between the flow rate in the propagation time difference system and the flow rate in the pulse-Doppler system based on the stability of the flow rate calculation.

In addition, the flow rate value combining unit 139 combines the flow rate value V1 of the propagation time difference system and the flow rate value V2 of the pulse-Doppler system at the determined combination ratio to calculate the flow rate of the fluid. In this case, it is easy to accurately measure the flow rate of the fluid regardless of the density of microbubbles contained in the fluid. In addition, the flow rate can be corrected by at least one of the first calculation unit 134 and the second calculation unit 135 based on the parameter such as the set outer diameter of the pipe P or the kinematic viscosity of the fluid. In this case, the flow rate of the fluid can be measured more accurately.

Furthermore, the control unit 33 of the display 30 generates the switching signal indicating any one of a state in which the flow rate is equal to or more than the predetermined threshold and a state in which the flow rate is less than the predetermined threshold. In this case, the ultrasonic flow sensor 100 operates as a flow switch. Here, it is required to calculate an actual flow rate with high reproducibility rather than calculating the actual flow rate absolutely accurately in a practical flow switch. Therefore, the ultrasonic flow sensor 100 can be operated as the practical flow switch in the hybrid mode.

(5) Other Embodiments (a) Since the flow rate value is calculated by multiplying the flow velocity by the cross-sectional area of the pipe P in the above embodiment, the inner diameter d of the pipe P is referred to at the time of calculating the flow rate value. In particular, the dimension of the pipe P to which the sensor head 10 is attached is not limited to one specific dimension in the above embodiment, and thus, the inner diameter d of the pipe P needs to be input by the user. In addition, the above embodiment adopts the configuration in which attachment is performed from the outside of the pipe P, and thus, the inner diameter d of the pipe P needs to be input by the user, which is different from a flow sensor including a portion that forms a part of the pipe P. Thus, in the above embodiment, Formula (1) to which a value related to a sonic velocity is applied is used so as to eliminate the influence of the deviation of the parameter of the velocity C and make any flow rate value have a similar deviation with respect to the deviation of the parameter of the inner diameter d. On the other hand, in an ultrasonic flow sensor that can be attached only to a specific diameter due to the specification or an ultrasonic flow sensor in which a part of a pipe through which a fluid flows is included in its configuration, the inner diameter d is a value defined in advance without requiring the input of the user. Even in these configurations, Formula (1) in which the velocity C is identified based on the measurement value may be used such that the flow rate of the propagation time difference system and the flow rate of the pulse-Doppler system do not deviate due to the deviation of the input velocity C.

(b) In the above embodiment, the flow rate value V1 of the fluid in the propagation time difference system is calculated by Formula (1) instead of Formula (3) regardless of the hybrid mode or the propagation time difference mode, but the embodiment is not limited thereto. It may be configured such that Formula (1) is applied only in the hybrid mode and the flow rate value V3 calculated by Formula (3) is output in the propagation time difference mode. In addition, it may be configured such that the flow rate value V of the fluid in the pulse-Doppler system is calculated by the following Formula (4) instead of Formula (2). Here, T is the above-described fluid propagation time and is identified based on actual measurement.

[Formula 4]

$$V = \frac{C'}{2\sin\theta'} \cdot \frac{\Delta f}{f} \cdot \frac{C\cos\theta}{2d} \cdot T \cdot \frac{d^2 \pi}{4} \cdot \lambda \quad (4)$$

In this case, the flow rate in the pulse-Doppler system is calculated by using Formula (4), in which a value included in Formula (2) is identified based on the measurement value such that a relationship between a flow rate and a value, which is included in Formula (3) and to be input by the user, is identical to a relationship between a flow rate and the value which is included in Formula (2) and to be input by the user. Specifically, the flow rate value V calculated by the pulse-Doppler system of Formula (4) is proportional to the velocity C and proportional to the inner diameter d of the pipe P, which is similar to the flow rate value V calculated by the propagation time difference system of Formula (3). That is, the degree of dependence of the value input by the user on the calculated flow rate value V is matched between the propagation time difference system and the pulse-Doppler system. Therefore, the possibility that the deviation between the flow rate value V calculated by the pulse-Doppler system and the flow rate value V calculated by the propagation time difference system increases due to the deviation of the value input by the user from the actual value is reduced.

(c) Although the flow rate calculation by the propagation time difference system and the flow rate calculation by the pulse-Doppler system are executed at predetermined time intervals in the hybrid mode to output the combined value of the calculated flow rates in the above embodiment, it may be configured such that a flow rate calculation system to be executed is switched according to the stability. For example, it may be configured such that the flow rate value by the propagation time difference system is output when the amount of microbubbles is small, and the flow rate value, obtained by combining the flow rate value by the propagation time difference system and the flow rate value by the pulse-Doppler system, is output when the amount of microbubbles is large.

(d) Although the flow rate of the fluid in the pulse-Doppler system is calculated based on the average value of the velocity distribution of the fluid flowing through the pipe P in the above embodiment, the embodiment is not limited thereto. The flow rate of the fluid in the pulse-Doppler system may be calculated based on a representative value other than the average value, such as a median value determined by the velocity distribution of the fluid flowing through the pipe P.

(e) In the above embodiment, the ultrasonic element 15A and the ultrasonic element 15B are arranged above the pipe P along the direction in which the pipe P extends, but the embodiment is not limited thereto. The ultrasonic element 15A and the ultrasonic element 15B may be arranged to face each other with the pipe P interposed therebetween. That is, one ultrasonic element may be arranged above the pipe P, and the other ultrasonic element may be arranged below the pipe P.

(6) Correspondence Relationship Between Each Constituent Element of Claims and Each Unit of Embodiment Hereinafter, an example of the correspondence between each constituent element of the claims and each unit of the embodiment will be described, but the invention is not limited to the following example. Various other elements having the configurations or functions described in the claims can be used as the respective constituent elements of the claims.

In the above embodiment, the pipe P is an example of a pipe, the ultrasonic flow sensor 100 is an example of an ultrasonic flow sensor, and the ultrasonic elements 15B and 15A are examples of first and second ultrasonic elements, respectively. The first measurement unit 132 is an example of a first measurement unit, the propagation time identifying unit 133 is an example of a propagation time identifying unit, the first calculation unit 134 is an example of a first calculation unit, the second measurement unit 135 is an example of a second measurement unit, and the second calculation unit 136 is an example of a second calculation unit. The wedge material 14 or the acoustic couplant 16 is an example of a path member. The storage unit 131 is an example of a storage unit, the flow rate value combining unit 139 is an example of a flow rate value combining unit, the control unit 33 is an example of a control unit, the operation unit 35 is an example of an operation unit, and the display lamps 18 and 37 are examples of a display lamp.

What is claimed is:

1. An ultrasonic flow sensor comprising:
   a plurality of ultrasonic elements that perform at least one of transmission and reception of an ultrasonic signal;
   a first measurement unit that measures a propagation time of the ultrasonic signal and a propagation time difference of the ultrasonic signal when the ultrasonic signal transmitted through a fluid in a pipe is transmitted and received between a pair of ultrasonic elements among the plurality of ultrasonic elements;
   a propagation time identifying unit that identifies a fluid propagation time that is a time for which the ultrasonic signal propagates in a path for propagating in the fluid in the pipe based on the propagation time of the ultrasonic signal measured by the first measurement unit;
   a first calculation unit that calculates a first flow rate value of the fluid in the pipe based on the propagation time difference of the ultrasonic signal measured by the first measurement unit, a measurement value corresponding to an ultrasonic velocity in the fluid in the pipe, and a parameter for identifying an inner diameter of the pipe;
   a second measurement unit that measures a frequency shift of the ultrasonic signal when one ultrasonic element or a pair of ultrasonic elements among the plurality of ultrasonic elements transmits the ultrasonic signal toward the fluid in the pipe and receives the ultrasonic signal reflected in the fluid; and a second calculation unit that calculates a second flow rate value of the fluid in the pipe based on the frequency shift of the ultrasonic signal measured by the second measurement unit and the parameter, wherein the first calculation unit calculates the first flow rate value using the fluid propagation time as the measurement value in accordance with a correspondence relationship among a distance of the path, the fluid propagation time, and the ultrasonic velocity.

2. The ultrasonic flow sensor according to claim 1, further comprising:

a path member that is located between the plurality of ultrasonic elements and the pipe and forms a part of an ultrasonic wave transmission path; and a storage unit that stores information related to a velocity of the ultrasonic signal in the path member in advance, wherein the propagation time identifying unit identifies the fluid propagation time based on the propagation time measured by the first measurement unit and the information related to the velocity of the ultrasonic signal in the path member stored in the storage unit.

3. The ultrasonic flow sensor according to claim 2, wherein the propagation time identifying unit identifies the fluid propagation time based on information related to a velocity of an ultrasonic wave in the pipe.

4. The ultrasonic flow sensor according to claim 3, wherein the propagation time identifying unit identifies the fluid propagation time based on the information related to the velocity of the ultrasonic wave in the pipe identified based on at least one of a material of the pipe and a thickness of the pipe.

5. The ultrasonic flow sensor according to claim 1, wherein the first measurement unit measures, as the propagation time of the ultrasonic signal, a propagation time of the ultrasonic signal propagating along a flow direction of the fluid in the pipe and a propagation time of the ultrasonic signal propagating against the flow direction of the fluid in the pipe, and the propagation time identifying unit identifies the fluid propagation time based on an average time of the propagation time of the ultrasonic signal propagating along the flow direction of the fluid in the pipe and the propagation time of the ultrasonic signal propagating against the flow direction of the fluid in the pipe.

6. The ultrasonic flow sensor according to claim 1, further comprising an operation unit that receives an operation of a user, wherein a mode for outputting the first flow rate value as a flow rate value and a mode for outputting the second flow rate value as a flow rate value are selected by the operation of the user received by the operation unit.

7. The ultrasonic flow sensor according to claim 6, further comprising a control unit that generates a switching signal indicating any one of a state in which the output flow rate value is equal to or more than a predetermined threshold and a state in which the output flow rate value is less than the predetermined threshold.

8. The ultrasonic flow sensor according to claim 7, further comprising an operation unit that receives setting of the predetermined threshold.

9. The ultrasonic flow sensor according to claim 7, further comprising a display lamp that displays a comparison result between the output flow rate value and the predetermined threshold.

10. The ultrasonic flow sensor according to claim 7, wherein the first calculation unit or the second calculation unit corrects the output flow rate value based on a set predetermined parameter.

11. The ultrasonic flow sensor according to claim 1, further comprising a flow rate value combining unit that combines the first flow rate value and the second flow rate value and outputs a combined flow rate value.

12. The ultrasonic flow sensor according to claim 11, wherein the flow rate value combining unit combines the first flow rate value and the second flow rate value based on stability of flow rate calculation.

13. An ultrasonic flow sensor comprising:

a plurality of ultrasonic elements that perform at least one of transmission and reception of an ultrasonic signal;

a first measurement unit that measures a propagation time of the ultrasonic signal and a propagation time difference of the ultrasonic signal when the ultrasonic signal transmitted through a fluid in a pipe is transmitted and received between a pair of ultrasonic elements among the plurality of ultrasonic elements;

a propagation time identifying unit that identifies a fluid propagation time that is a time for which the ultrasonic signal propagates in a path for propagating in the fluid in the pipe based on the propagation time of the ultrasonic signal measured by the first measurement unit;

a first calculation unit that calculates a first flow rate value of the fluid in the pipe based on the propagation time difference of the ultrasonic signal measured by the first measurement unit, a measurement value corresponding to an ultrasonic velocity in the fluid in the pipe, and a parameter for identifying an inner diameter of the pipe;

a second measurement unit that measures a frequency shift of the ultrasonic signal when one ultrasonic element or a pair of ultrasonic elements among the plurality of ultrasonic elements transmits the ultrasonic signal toward the fluid in the pipe and receives the ultrasonic signal reflected in the fluid; and a second calculation unit that calculates a second flow rate value of the fluid in the pipe based on the frequency shift of the ultrasonic signal measured by the second measurement unit and the parameter, wherein the first calculation unit calculates the first flow rate value using the fluid propagation time as the measurement value to reduce a difference in influence of the parameter with respect to the first flow rate value and the second flow rate value.

14. An ultrasonic flow sensor that measures a flow rate of a fluid flowing in a pipe, the ultrasonic flow sensor comprising:

a first ultrasonic element that transmits and receives an ultrasonic wave;

a second ultrasonic element that transmits and receives an ultrasonic wave;

a first calculation unit that calculates a first flow rate value indicating a flow rate of the fluid based on a propagation time difference of the ultrasonic wave between the first ultrasonic element and the second ultrasonic element; and a second calculation unit that calculates a second flow rate value indicating a flow rate of the fluid based on a frequency shift of the ultrasonic wave received by the first ultrasonic element after the first ultrasonic element transmits the ultrasonic wave, wherein at least one of the first flow rate value and the second flow rate value is calculated using a calculation formula in which a value which is to be input by a user is identified based on a measurement value to make a relationship between the first flow rate value and a value, which is included in a calculation formula for the first flow rate value and to be input by the user, identical to a relationship between the second flow rate value and a value which is included in a calculation formula for the second flow rate value and to be input by the user.

* * * * *